(12) United States Patent
Cheong et al.

(10) Patent No.: US 12,408,219 B2
(45) Date of Patent: Sep. 2, 2025

(54) ELECTRONIC DEVICE AND METHOD FOR ADAPTIVE COMMUNICATION IN WIRELESS ENVIRONMENT

(71) Applicant: SAMSUNG ELECTRONICS CO., LTD., Suwon-si (KR)

(72) Inventors: Gupil Cheong, Suwon-si (KR); Doosuk Kang, Suwon-si (KR); Gibeom Kim, Suwon-si (KR); Hocheol Seo, Suwon-si (KR); Hyungseoung Yoo, Suwon-si (KR); Siejoon Cho, Suwon-si (KR); Juyeon Jin, Suwon-si (KR); Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 385 days.

(21) Appl. No.: 18/113,931

(22) Filed: Feb. 24, 2023

(65) Prior Publication Data
US 2024/0023177 A1     Jan. 18, 2024

Related U.S. Application Data

(63) Continuation of application No. PCT/KR2023/002148, filed on Feb. 14, 2023.

(30) Foreign Application Priority Data

May 20, 2022  (KR) .................. 10-2022-0062240
Jun. 7, 2022   (KR) .................. 10-2022-0069169

(51) Int. Cl.
*H04W 76/14*    (2018.01)
(52) U.S. Cl.
CPC .................. *H04W 76/14* (2018.02)

(58) Field of Classification Search
CPC ...................................... H04W 76/14
(Continued)

(56) References Cited

U.S. PATENT DOCUMENTS 10,856,297 B2    12/2020  Chen
2019/0045304 A1*  2/2019  Bhalla .............. H04R 3/12
(Continued)

FOREIGN PATENT DOCUMENTS

CN    112740728 B    6/2022
EP    4 383 768 A1   6/2024
(Continued)

OTHER PUBLICATIONS

International Search Report and Written Opinion (PCT/ISA/210 and PCT/ISA/237) dated May 12, 2023, issued by International Searching Authority for International Application No. PCT/KR2023/002148.
(Continued)

*Primary Examiner* — April G Gonzales
(74) *Attorney, Agent, or Firm* — Sughrue Mion, PLLC

(57) ABSTRACT

An electronic device includes a processor configured to: obtain a Connected Isochronous Group (CIG) event including a first Connected Isochronous Stream (CIS) event and a second CIS event at least partially overlapped with at least a part of the first CIS event; identify first data indicating a quality of a first link (with a first external device) for the first CIS event and second data indicating a quality of a second link (with a second external device) for the second CIS event; transmit, based on the first data and the second data either a first packet to the first external device or a second packet to the second electronic device.

20 Claims, 17 Drawing Sheets

(58) Field of Classification Search
USPC .......................................................... 455/41.2
See application file for complete search history.

(56) References Cited

U.S. PATENT DOCUMENTS

| | | | |
|---|---|---|---|
| 2020/0260322 A1* | 8/2020 | Chen | H04L 1/16 |
| 2020/0260448 A1* | 8/2020 | Chen | H04W 72/0453 |
| 2021/0306103 A1* | 9/2021 | Young | H04L 1/1887 |
| 2022/0039041 A1* | 2/2022 | Zhu | G06F 3/165 |
| 2022/0078541 A1* | 3/2022 | Zhu | H04W 4/38 |
| 2022/0124471 A1* | 4/2022 | Chen | H04L 1/1874 |
| 2023/0071138 A1* | 3/2023 | Cheong | H04W 88/02 |

FOREIGN PATENT DOCUMENTS

| | | |
|---|---|---|
| KR | 10-2023-0036955 A | 3/2023 |
| WO | 2020/124610 A1 | 6/2020 |

OTHER PUBLICATIONS

Communication issued on May 19, 2025 by the European Patent Office for European Patent Application No. 23807739.0.

* cited by examiner

ELECTRONIC DEVICE AND METHOD FOR ADAPTIVE COMMUNICATION IN WIRELESS ENVIRONMENT

CROSS-REFERENCE TO RELATED APPLICATIONS

This application is a by-pass continuation application of International Application No. PCT/KR2023/002148, filed on Feb. 14, 2023, which based on and claims priority to Korean Patent Application Nos. 10-2022-0062240, filed on May 20, 2022 and 10-2022-0069169, filed on Jun. 7, 2022, in the Korean Intellectual Property Office, the disclosures of which are incorporated by reference herein in their entireties.

BACKGROUND

1. Field

One or more embodiments relate to an electronic device and a method for adaptive communication in a wireless environment.

2. Description of Related Art

Compared to legacy Bluetooth® (or classical Bluetooth), Bluetooth Low Energy (BLE) may provide reduced power consumption and at least a similar, or often greater, communication range between connected devices. The BLE may be provided on an Industrial, Scientific, and Medical (ISM) radio band.

SUMMARY

An electronic device is described. The electronic device may include a communication circuit and a processor. The processor may be configured to obtain a connected isochronous group (CIG) event including a first connected isochronous stream (CIS) event and a second CIS event at least partially overlapped with at least a part of the first CIS event. The processor may be configured to identify first data indicating quality of a first link for the first CIS event and second data indicating quality of a second link for the second CIS event, the first link between the electronic device and a first external electronic device, the second link between the electronic device and a second external electronic device. The processor may be configured to transmit, by using the communication circuit, a first packet to the first external electronic device via a sub event of the first CIS event in a time interval where the first CIS event and the second CIS event are overlapped or transmit, by using the communication circuit, a second packet to the second external electronic device via a sub event of the second CIS event in the time interval where the first CIS event and the second CIS event are overlapped, based on the first data and the second data.

A method for an electronic device including a communication circuit is described. The method may comprise obtaining a connected isochronous group (CIG) event including a first connected isochronous stream (CIS) event and a second CIS event at least partially overlapped with at least a part of the first CIS event. The method may comprise identifying first data indicating quality of a first link for the first CIS event and second data indicating quality of a second link for the second CIS event, the first link between the electronic device and a first external electronic device, the second link between the electronic device and a second external electronic device. The method may comprise transmitting, by using the communication circuit, a first packet to the first external electronic device via a sub event of the first CIS event in a time interval where the first CIS event and the second CIS event are overlapped or transmitting, by using the communication circuit, a second packet to the second external electronic device via a sub event of the second CIS event in the time interval where the first CIS event and the second CIS event are overlapped, based on the first data and the second data.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
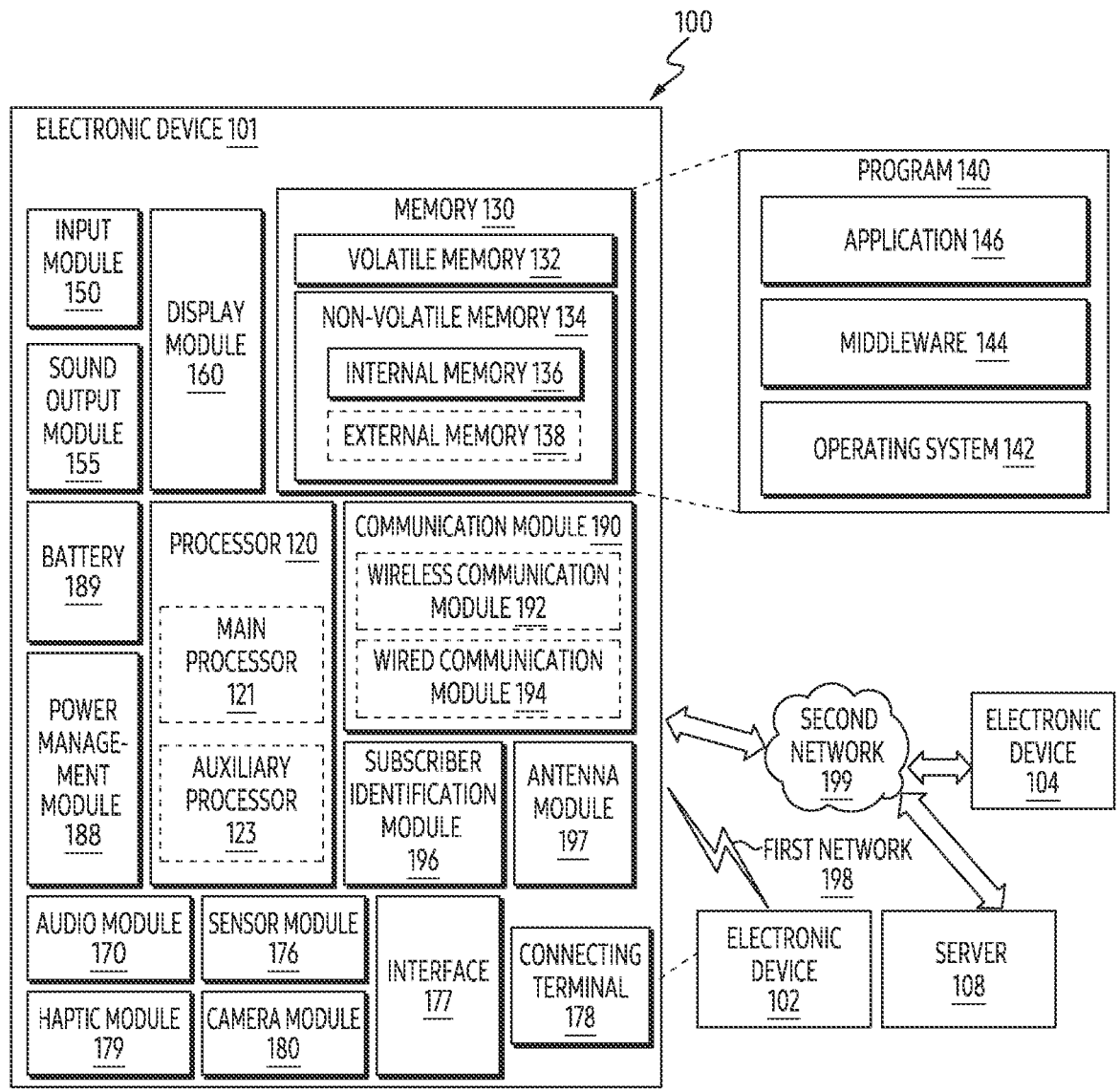
FIG. 1 illustrates an electronic device in a network environment according to one or more embodiments.

FIG. 1 illustrates an electronic device 101 in a network environment 100 according to one or more embodiments. In FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network).

According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a Subscriber Identification Module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

For example, the processor 120 may execute software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a Central Processing Unit (CPU) or an Application Processor (AP)), or an auxiliary processor 123 (e.g., a Graphics Processing Unit (GPU), a Neural Processing Unit (NPU), an Image Signal Processor (ISP), a sensor hub processor, or a Communication Processor (CP)) that is operable independently from, or in conjunction with, the main processor 121.

For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108).

Learning algorithms may include, but are not limited to, e.g., supervised learning, unsupervised learning, semi-supervised learning, or reinforcement learning. The artificial intelligence model may include a plurality of artificial neural network layers. The artificial neural network may be a Deep Neural Network (DNN), a Convolutional Neural Network (CNN), a Recurrent Neural Network (RNN), a Restricted Boltzmann Machine (RBM), a Deep Belief Network (DBN), a Bidirectional Recurrent Deep Neural Network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related to the data. The memory 130 may include the volatile memory 132 or the non-volatile memory 134. The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a High Definition Multimedia Interface (HDMI), a Universal Serial Bus (USB) interface, a Secure Digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a Power Management Integrated Circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a Power Line Communication (PLC) module). A corresponding one of these communication modules may communicate with the external electronic device via the first network 198 (e.g., a short-range communication network, such as Bluetooth™, Wireless-Fidelity (Wi-Fi) direct, or Infrared Data Association (IrDA)) or the second network 199 (e.g., a long-range communication network, such as a legacy cellular network, a 5G network, a next-generation communication network, the Internet, or a computer network (e.g., LAN or Wide Area Network (WAN)).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., International Mobile Subscriber Identity (IMSI)) stored in the SIM 196.

The wireless communication module 192 may support a 5G network, after a 4G network, and next-generation communication technology, e.g., new radio (NR) access technology. The NR access technology may support enhanced Mobile Broadband (eMBB), massive Machine Type Communications (mMTC), or Ultra-Reliable And Low-Latency Communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive Multiple-Input and Multiple-Output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a Printed Circuit Board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a Radio Frequency Integrated Circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, General Purpose Input And Output (GPIO), Serial Peripheral Interface (SPI), or Mobile Industry Processor Interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101.

The electronic device 101 may provide the outcome, with or without further processing of the outcome, as at least part of a reply to the request. To that end, a cloud computing, distributed computing, Mobile Edge Computing (MEC), or client-server computing technology may be used, for example. The electronic device 101 may provide ultra-low-latency services using, e.g., distributed computing or mobile edge computing. In another embodiment, the external electronic device 104 may include an Internet-of-Things (IoT) device.

The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

An electronic device may transmit data (or a packet) including information on multimedia content to each of a plurality of external electronic devices by using isochronous logical transport referred to as Connected Isochronous Stream (CIS) via an isochronous link between each of the plurality of external electronic devices and the electronic device. For example, the CIS may be configured as a Connected Isochronous Group (CIG) event including a plurality of CIS events. For example, resources for the CIG event for communication with each of the plurality of external electronic devices may be limited.

The quality of the link between each of the plurality of external electronic devices and the electronic device for communication through the CIG event may be changed due to a change in a state of a wireless environment including the electronic device and the plurality of external electronic devices. Therefore, based on the change in the quality of the link caused while the communication through the CIG event is performed using limited resources, a method for adaptively performing the communication for the CIG event may be required.

Figure 2:
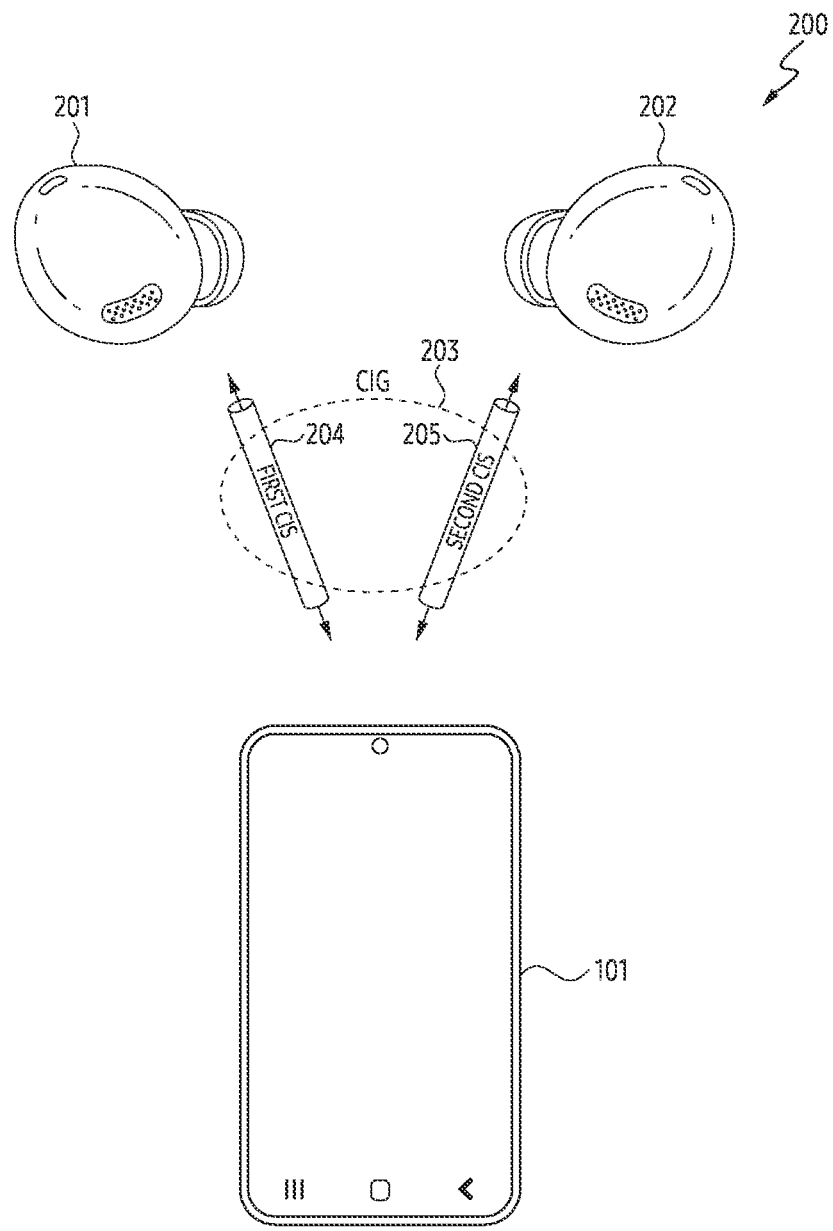
FIG. 2 illustrates an example of a wireless environment including an electronic device.

FIG. 2 illustrates an example of a wireless environment including an electronic device.

Referring to FIG. 2, the wireless environment 200 may include an electronic device 101, a first external electronic device 201, and a second external electronic device 202.

The electronic device 101 in the wireless environment 200 may be an audio source device such as a smartphone, a laptop computer, a desktop computer, or a tablet PC. For example, the electronic device 101 may transmit data on audio played in the electronic device 101 to each of the first external electronic device 201 and the second external electronic device 202.

For example, the data may be usable in each of the first external electronic device 201 and the second external electronic device 202 to output the audio from each of the first external electronic device 201 and the second external electronic device 202. For example, the electronic device 101 may transmit a request to the first external electronic device 201 and the second external electronic device 202, respectively, in order to receive data on audio (obtained by the first external electronic device 201 and the second external electronic device 202) from the first external electronic device 201 and the second external electronic device 202, respectively.

For example, the electronic device 101 may receive the data on the audio from the first external electronic device 201 and the second external electronic device 202 in response to the request. In an embodiment, the electronic device 101 may be referred to as a central device, a primary device, or a main device.

The first external electronic device 201 and the second external electronic device 202 in the wireless environment 200 may be audio sink devices such as earbuds or earphones. For example, the first external electronic device 201 and the second external electronic device 202 may be configured as a pair. However, it is not limited thereto. For example, each of the first external electronic device 201 and the second external electronic device 202 may receive data on audio from the electronic device 101 and output the audio through speakers of each of the first external electronic device 201 and the second external electronic device 202, based on the data. For example, the data may be usable for reproduce the audio in the electronic device 101. In an embodiment, each of the first external electronic device 201 and the second external electronic device 202 may be referred to as a peripheral device, a secondary device, or a sub device.

The electronic device 101, the first external electronic device 201, and the second external electronic device 202 may support multi-stream audio. For example, synchronized, independent, multiple audio streams may be transmitted between the electronic device 101 and the first external electronic device 201 and/or between the electronic device 101 and the second external electronic device 202. For example, a Connected Isochronous Group CIG 203 including Connected Isochronous Streams (CIS) may be used to support the multi-stream audio.

For example, the CIG 203 may include two or more CISs having the same isochronous (ISO) interval. For example, the CIG 203 may include a first CIS 204 and a second CIS 205. For example, each of the first CIS 204 and the second CIS 205 may be a logical transport that causes the first external electronic device 101, the first external electronic device 201, and the second external electronic device 202 to transfer uni-directionally (or bi-directionally) isochronous data. For example, each of the first CIS 204 and the second CIS 205 may be related to an asynchronous connection (ACL). For example, each of the first CIS 204 and the second CIS 205 may support variable-sized packets and may support transmitting one or more packets within an isochronous event.

For example, the first CIS 204 may be used to transmit at least one packet from the electronic device 101 to the first external electronic device 201. For example, the at least one packet may be used to output audio played in the electronic device 101 through a speaker of the first external electronic device 201. For example, the first CIS 204 may be used to transmit an acknowledgement signal for the at least one packet or a non-acknowledgement signal for the at least one packet from the first external electronic device 201 to the electronic device 101.

For example, the acknowledgement signal may be transmitted from the first external electronic device 201 to the electronic device 101 through the first CIS 204 to indicate that the first external electronic device 201 successfully receives the at least one packet, and wherein the non-acknowledgement signal may be transmitted from the first external electronic device 201 to the electronic device 101 through the first CIS 204 to indicate that the first external electronic device 201 fails to receive the at least one packet.

For example, the first CIS 204 may be used to transmit at least one packet from the electronic device 101 to the first external electronic device 201. For example, the at least one packet may be used to obtain audio played in the electronic device 101 from the first external electronic device 201. For example, the at least one packet may be a dummy packet or a null packet. For example, the first CIS 204 may be used to transmit a response packet for the at least one packet from the first external electronic device 201 to the electronic device 101, the response packet including data on the audio. For example, the response packet may cause the electronic device 101 to play at least a part of the audio.

For example, the second CIS 205 may be used to transmit at least one packet from the electronic device 101 to the second external electronic device 202. For example, the at least one packet may be used to output audio played in the electronic device 101 through a speaker of the second external electronic device 202. For example, the audio output through the speaker of the first external electronic device 201 and the audio output through the speaker of the second external electronic device 202 may provide stereophonic sound. However, it is not limited thereto. For example, the second CIS 205 may be used to transmit an acknowledgement signal for the at least one packet or a non-acknowledgement signal for the at least one packet from the second external electronic device 202 to the electronic device 101.

For example, the second CIS 205 may be used to transmit at least one packet from the electronic device 101 to the second external electronic device 202. For example, the at least one packet may be used to obtain audio played in the electronic device 101 from the second external electronic device 202. For example, the at least one packet may be a dummy packet or a null packet. For example, the second CIS 205 may be used to transmit a response packet for the at least one packet from the second external electronic device 202 to the electronic device 101, a response packet including data on the audio. For example, the response packet may cause the electronic device 101 to play at least a part of the audio.

For example, the audio obtained through the response packet received from the first external electronic device 201 and the audio obtained through the response packet received from the second external electronic device 202 may be provided together to provide stereophonic sound or directional sound. However, it is not limited thereto.

Figure 3:
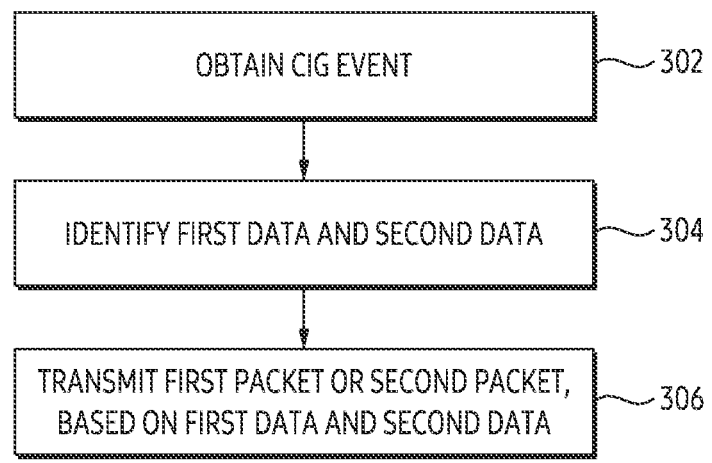
FIG. 3 illustrates an exemplary method of adaptively transmitting a packet through a Connected Isochronous Group (CIG) event having a hybrid arrangement through first data and second data.

FIG. 3 illustrates an exemplary method of adaptively transmitting a packet through a connected isochronous group (CIG) event having a hybrid arrangement through first data and second data. The method may be executed by the electronic device 101 or the processor 120 of the electronic device 101 illustrated in FIG. 1.

In FIG. 3, in operation 302, the processor 120 may obtain a CIG event. For example, the processor 120 may obtain the CIG event including a first CIS event and a second CIS event at least partially overlapped with a part of the first CIS event.

For example, the processor 120 may schedule, allocate, obtain, configure, identify, or set the CIG event (e.g., the event of CIG 203 illustrated in FIG. 2) that includes the first CIS event for the first external electronic device 201 (e.g., the event of the first CIS 204 illustrated in FIG. 2) and the second CIS event for the second external electronic device 202 (e.g., the event of the second CIS 205 illustrated in FIG. 2) to transmit data or at least one packet to each of the first external electronic device 201 and the second external electronic device 202.

For example, the processor 120 may schedule, allocate, obtain, compose, identify, or configure the CIG event that includes the first CIS event for the first external electronic device 201 and the second CIS event for the second external electronic device 202 to receive data or at least one packet from each of the first external electronic device 201 and the second external electronic device 202.

For example, the CIG event including the first CIS event and the second CIS event may initiate at a start timing of an initial sub event of the initially scheduled CIS and end at an end timing of the last sub event within an ISO interval. For example, an anchor point of the CIG event may occur simultaneously with an anchor point of the initial CIS event within the CIG event.

For example, each of the first CIS event and the second CIS event may include one or more sub events. For example, a sub event within the first CIS event may be used to transmit a packet from the electronic device 101 and to transmit a response packet (e.g., the acknowledgement signal defined in the description of FIG. 2, the non-acknowledgement signal defined in the description of FIG. 2, or the response packet defined in the description of FIG. 2) from the first external electronic device 201. For example, a sub event within the second CIS event may be used to transmit a packet from the electronic device 101 and a response packet from the second external electronic device 202.

For example, the first CIS event and the second CIS event may be scheduled in a hybrid arrangement within the CIG event. For example, the processor 120 may obtain, configure, identify, or set the CIG event by scheduling the second CIS event at least partially overlapped with at least a part of the first CIS event, to adaptively change the number of times of at least one transmission through the first CIS event and the number of times of at least one transmission through the second CIS event.

For example, the processor 120 may obtain, configure, identify, or set the CIG event by scheduling the second CIS event at least partially overlapped with the first CIS event, to adaptively change the number of times of at least one reception through the first CIS event and the number of times of at least one reception through the second CIS event. For example, the processor 120 may obtain the CIG event including the first CIS event and the second CIS event at least partially overlapped with the first CIS event, by scheduling an anchor point of the second CIS event in the first CIS event.

For example, the processor 120 may obtain the CIG event including the first CIS event and the second CIS event including sub event at least partially overlapped with at least a part of sub event of the first CIS event. For example, the hybrid arrangement may indicate that it has both characteristics of a sequential arrangement and an interleave arrangement defined within a standard for Bluetooth ca Low Energy (BLE) according to overlapping at least a part of the first CIS event and at least a part of the second CIS event.

For example, the processor 120 may obtain the CIG event including the first CIS event and the second CIS event in a hybrid arrangement of one type among various types of hybrid arrangements. For example, the hybrid arrangement of the type may be identified based on the service type or characteristics provided through the CIG event. However, it is not limited thereto. For example, the hybrid arrangements of various types may be illustrated in the description of FIGS. 4A to 4C.

Figure 4A:
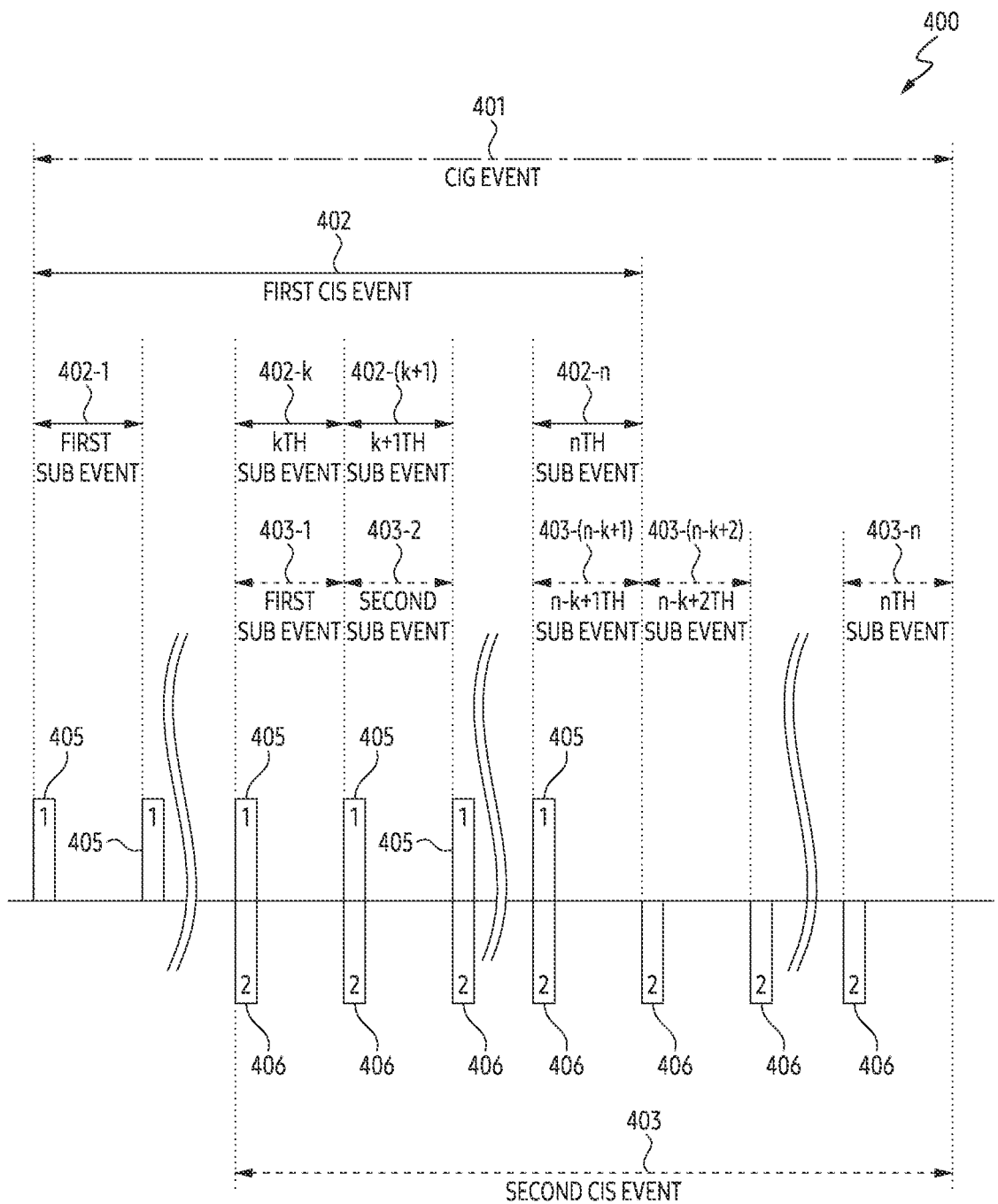
FIGS. 4A to 4C illustrate an exemplary CIG event having a hybrid arrangement.
Figure 4B:
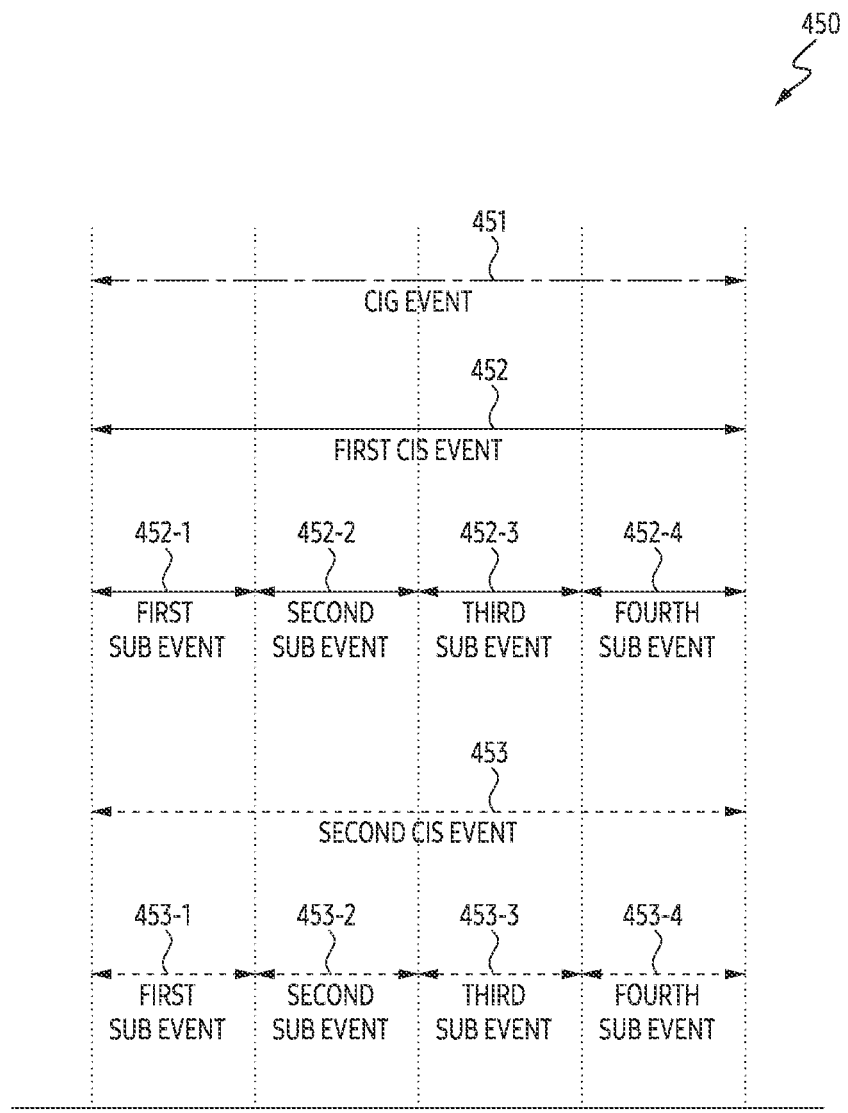
Figure 4C:
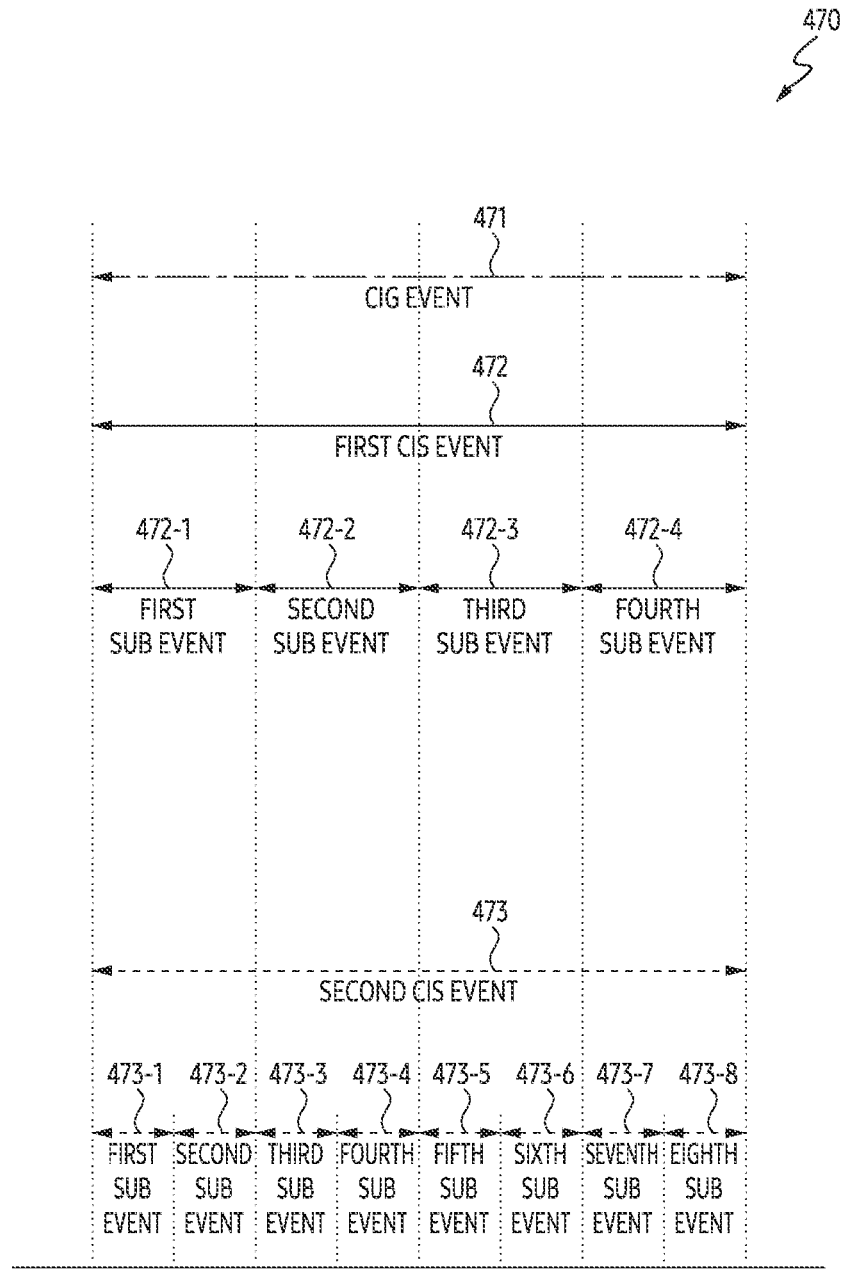

FIGS. 4A to 4C illustrate an exemplary CIG event having a hybrid arrangement.

For example, in FIG. 4A, as illustrated in the chart 400, the processor 120 may set or obtain a CIG event 401 including a first CIS event 402 and a second CIS event 403 partially overlapped with a part of the first CIS event 402.

For example, the processor 120 may set or obtain the CIG event 401 by scheduling the first CIS event 402 and the second CIS event 403 so that each of the kth sub event 402-$k$ to the nth sub event 402-$n$ in the first CIS event 402 overlaps each of the first sub event 403-1 to the n−k+1th sub event 430-($n$−k+1) in the second CIS event 403 (herein, k is a natural number greater than 1 and less than n). The number of times a packet can be transmitted through the first CIS event 402 may be k−1 times to n times, since the first CIS event 402 includes kth sub event 402-$k$ to nth sub event (402-$n$) overlapped respectively with the first sub event 403-1 to the n−k+1th sub event 403-($n$−k+1) and the first sub event 402-1 to the k−1th sub event 402-($k$−1) that do not overlap with the second CIS event 403.

As illustrated in the chart 400 of FIG. 4A, since the second CIS event 403 includes the first sub event 403-1 to the n−k+1th sub event 403-($n$−k+1) overlapped respectively with the kth sub event 402-$k$ to the nth sub event 402-$n$ and the n−k+2th sub event 403-($n$−k+2) to the nth sub event 403-$n$ that do not overlap with the first CIS event 402, the number of times a packet can be transmitted through the second CIS event 403 may be k−1 times to n times in the second CIS event 403. For example, the processor 120 may be configured to transmit a packet 405 for the first external electronic device 201 through at least a part of the time interval of the first CIS event 402, which does not overlap with the second CIS event 403 (e.g., the first sub event 402-1 to the k−1th sub event 402-($k$−1)), transmit one of the packet 405 for the first external electronic device 201 and a packet 406 for the second external electronic device 202 through at least a part of the time interval (e.g., the kth sub event 402-$k$ to the nth sub event 402-$n$) of the first CIS event 402 overlapping the second CIS event 403 or the time interval (e.g., the first sub event 403-1 to the n−k+1th sub event 403-($n$−k+1)) of the second CIS event 403 overlapping the first CIS event 402, and transmit a packet 406 for the second external electronic device 202 through at least a part of the time interval (e.g., n−k+2th sub event 403-($n$−k+2) to nth sub event 403-$n$) of the second CIS event 403, which does not overlap the first CIS event 402.

For example, since the time interval in which the first CIS event 402 and the second CIS event 403 overlap includes all of the first sub event 403-1 to the n−k+1th sub event 403-($n$−k+1) of the second CIS event 403 that are overlapped respectively with the kth sub event 402-$k$ to the nth sub event 402-$n$ of the first CIS event 402 and the kth sub event 402-$k$ to the nth sub event 402-$n$ of the first CIS event 402, the time interval may be a time interval capable of adaptively selecting a transmission from a transmission to the first external electronic device 201 and another transmission to the second external electronic device 202, for each sub event of the first CIS event 402 or sub event of the second CIS event 403.

FIG. 4A illustrates an example in which the length of each of the first sub event 402-1 to the nth sub event 402-$n$ in the first CIS event 402 is the same as the length of each of the first sub event 403 to the nth sub event 403-$n$ in the second CIS event 403.

For example, each anchor points of at least a part (e.g., the kth sub event 402-$k$ to the nth sub event 402-$n$) of the first sub event 402-1 to the nth sub event 402-$n$ within the first CIS event 402 corresponds to each anchor points of at least a part (e.g., the first sub event 403-1 to the n−k+1 sub event 403-($n$−k+1)) of the first sub event 403-1 to the nth sub event 403-$n$ in the second CIS event 403. Even if the length of each of the first sub event 402-1 to the nth sub event 402-$n$ in the first CIS event 402 and the length of each of the first sub event 403-1 to the nth sub event 403-$n$ in the second CIS event 403 are different, the processor 120 may obtain the CIG event 401 that includes the first CIS event 402 and the second CIS event 403 at least partially overlapped with at least a part of the first CIS event 402.

For example, an interval between anchor points of the first sub event 402-1 to the nth sub event 402-$n$ within the first CIS event 402 is a multiple of an interval between anchor points of the first sub event 403-1 to the nth sub event 403-$n$ within the second CIS event 403. Further, an offset of an anchor point of each of the first sub event 402-1 to the nth sub event 402-$n$ within the first CIS event 402 matches an offset of an anchor point of the first sub event 403-1 to the nth sub event 403-$n$ within the second CIS event 403. Then, the processor 120 may obtain the CIG event 401 that includes the first CIS event 402 and the second CIS event 403 at least partially overlapped with at least a part of the first CIS event 402.

For example, t an interval between anchor points of the first sub event 403-1 to the nth sub event 403-$n$ within the second CIS event 403 is a multiple of an interval between anchor points of the first sub event 402-1 to the nth sub event 402-$n$ within the first CIS event 402. Further, an offset of an anchor point of each of the first sub event 402-1 to the nth sub event 402-$n$ within the first CIS event 402 match an offset of an anchor point of the first sub event 403-1 to the nth sub event 403-$n$ within the second CIS event 403 and a distance between anchor points of the first sub event 402-1 to the nth sub event 402-$n$ within the first CIS event 402 is a multiple of a distance between anchor points of the first sub event 403-1 to the nth sub event 403-$n$ within the second CIS event 403. Then, the processor 120 may obtain the CIG event 401 that includes the first CIS event 402 and the second CIS event 403 at least partially overlapped with at least a part of the first CIS event 402.

For example, in FIG. 4B, as shown in the chart 450, the processor 120 may obtain CIG event 451 that includes a first CIS event 452 and a second CIS event 453 completely overlapped with the first CIS event 452. For example, the processor 120 may obtain the CIG event 451 by scheduling the first CIS event 452 and the second CIS event 453 so that each of the first sub event 452-1 to the fourth sub event 452-4 of the first CIS event 452 overlaps the first sub event 453-1 to the fourth sub event 453-4 of the second CIS event 453.

Since the first CIS event 452 and the second CIS event 453 are completely overlapped within the CIG event 451, the processor 120 may adaptively change the number of times capable of transmitting a packet through the first CIS event 452 and the number of times a capable of transmitting a packet through the second CIS event 453. For example, since the time interval for the CIG event 451 includes both the first sub event 452-1 to the fourth sub event 452-4 and the first sub event 453-1 to the fourth sub event 453-4 that are overlapped respectively with the first sub event 452-1 to the fourth sub event 452-4, the time interval for the CIG event 451 mat be a time interval capable of adaptively selecting a transmission from a transmission to the first external electronic device 201 and another transmission to the second external electronic device 202, for each sub event of the first CIS event 452 or sub event of the second CIS event 453.

FIG. 4B illustrates an example in which the length of each of the first sub event 452-1 to the fourth sub event 452-4 in the first CIS event 452 is the same as the length of each of the first sub event 453-1 to the fourth sub event 453-4 in the second CIS event 453.

For example, each anchor points of the anchor points of each of the sub events of the first CIS event 452 correspond to the anchor points of each of the sub events of the second CIS event 453, even if the length of each of the sub events of the first CIS event 452 is different from the length of each of the sub events of the second CIS event 453. Then, the processor 120 may obtain the CIG event 451 including the first CIS event 452 and the second CIS event 453 overlapped with the first CIS event 452.

For example, an interval between anchor points of the first CIS event 452 is a multiple of an interval between anchor points of the second CIS event 453. Further, an offset of each of anchor points of the sub events of the first CIS event 452 match an offset of each of the anchor points of the sub events of the second CIS event 453. Then, the processor 120 may obtain the CIG event 451 that includes the first CIS event 452 and the second CIS event 453 overlapped with the first CIS event 452. For example, the CIG event 451 will be illustrated in the description of FIG. 4C.

For example, an interval between anchor points of the second CIS event 453 is a multiple of an interval between anchor points of the first CIS event 452 and an offset of each of an anchor points of the sub events of the first CIS event 452 match an offset of each of the anchor points of the sub events of the second CIS event 453 Then, the processor 120 may obtain the CIG event 451 that includes the first CIS event 452 and the second CIS event 453 overlapped with the first CIS event 452.

For example, in FIG. 4C, as illustrated in the chart 470, a CIG event 471 may include a first CIS event 472 and a second CIS event 473 completely overlapped with the first CIS event 472. For example, the processor 120 may obtain the CIG event 471 by scheduling the first CIS event 472 and the second CIS event 473 so that the first sub event 472-1 of the first CIS event 472 overlaps the first sub event 473-1 and the second sub event 473-2 of the second CIS event 473, the second sub event 472-2 of the first CIS event 472 overlaps the third sub event 473-3 and the fourth sub event 473-4 of the second CIS event 473, the third sub event 472-3 of the first CIS event 472 overlaps the fifth sub event 473-5 and the sixth sub event 473-6 of the second CIS event 473, and the fourth sub event 472-4 of the first CIS event 472 overlaps the seventh sub event 473-7 and the eighth sub event 473-8 of the second CIS event 473.

For example, unlike the CIG event 401 and the CIG event 451 illustrated respectively in FIGS. 4A and 4B, the number of sub events of the first CIS event 472 of the CIG event 471 may be different from the number of sub events of the second CIS event 473 of the CIG event 471. For example, unlike the CIG event 401 and the CIG event 451 illustrated respectively in FIGS. 4A and 4B, an interval between anchor points of the sub events of the first CIS event 472 of the CIG event 471 may be longer than an interval between anchor points of the sub events of the second CIS event 473 of the CIG event 471.

For example, unlike the CIG event 401 and the CIG event 451 illustrated respectively in FIGS. 4A and 4B, the number of times capable of transmitting a packet through the first CIS event 472 may be different from the number of times capable of transmitting a packet through the second CIS event 473. For example, the interval between the anchor points of the sub events of the first CIS event 472 of the CIG event 471 may be a multiple of the interval between the anchor points of the sub events of the second CIS event 473 of the CIG event 471.

For example, the offset of each anchor point of each of the sub events of the first CIS event 472 of the CIG event 471 may be the same as the offset of each anchor point of each of the sub events of the second CIS event 473 of the CIG event 471. For example, the position of the anchor point of the first sub event 472-1 of the first CIS event 472 may be the same as the position of the anchor point of the first sub event 473-1 of the second CIS event 473. The position of the anchor point of the second sub event 472-2 of the first CIS event 472 may be the same as the position of the anchor point of the third sub event 473-3 of the second CIS event 473. The position of the anchor point of the third sub event 472-3 of the first CIS event 472 may be the same as the position of the anchor point of the fifth sub event 473-5 of the second CIS event 473. The position of the anchor point of the fourth sub event 472-4 of the first CIS event 472 may be the same as the position of the anchor point of the seventh sub event 473-7 of the second CIS event 473.

For example, the anchor point of the second sub event 473-2 of the second CIS event 473 may be within the first sub event 472-1 of the first CIS event 472. The anchor point of the fourth sub event 473-4 of the second CIS event 473 may be within the second sub event 472-2 of the first CIS event 472. The anchor point of the sixth sub event 473-6 of the second CIS event 473 may be within the third sub event 472-3 of the first CIS event 472. The anchor point of the eighth sub event 473-8 of the second CIS event 473 may be in the fourth sub event 472-4 of the first CIS event 472. For example, the sub events of the first CIS event 472 may be synchronized with the sub events of the second CIS event 473.

For example, since the interval between the anchor points of the sub events of the first CIS event 472 within the time interval for the CIG event 471 is longer than the interval between the anchor points of the sub events of the second CIS event 473 within the time interval, the time interval may be capable of adaptively selecting a transmission between a transmission to the first external electronic device 201 and another transmission to the second external electronic device 202, for each sub event of the first CIS event 472.

Referring back to FIG. 3, in operation 304, the processor 120 may identify (read and recognize) first data indicating the quality of the first link for the first CIS event and second data indicating the quality of the second link for the second CIS event. For example, the first link may be a link between the electronic device 101 and the first external electronic device 201, and the second link may be a link between the electronic device 101 and the second external electronic device 202.

For example, the first data may indicate the quality of the first link and may be data on the state of the first buffer for the first CIS event. For example, the first data may indicate the number of at least one Protocol Data Unit (PDU) stored in the first buffer, at least temporarily. For example, the at least one PDU may be a PDU not transmitted to the first external electronic device 201 through the first CIS event among PDUs identified based on a Burst Number (BN) (e.g., BN defined within the standard) and a Flush Timeout (FT) (e.g., FT defined within the standard). However, it is not limited thereto.

For example, the second data may indicate the quality of the second link and may be data on the state of the second buffer for the second CIS event. For example, the second data may indicate the number of at least one protocol data unit (PDU) stored in the second buffer at least temporarily. For example, the at least one PDU may be a PDU not transmitted to the second external electronic device 202 through the second CIS event among PDUs identified based on a burst number (BN) and a flush timeout (FT). However, it is not limited thereto.

For example, the first data may indicate the remaining lifetime of a packet (e.g., the first packet to be illustrated in the description of operation 306) to be transmitted through the sub event of the first CIS event. For example, the remaining lifetime may indicate a flush point of the packet. For example, the flush point may indicate a timing or in-time at which the packet is deleted by a link layer. For example, the packet may be retransmitted until an acknowledgment signal for the packet is received or until the flush point is reached.

For example, the remaining lifetime may indicate a time until a timing corresponding to the flush point of the packet. However, it is not limited thereto. For example, since the remaining lifetime of the packet may be relatively long on a condition that the quality of the first link is relatively high, and the remaining lifetime of the packet may be relatively short on a condition that the quality of the first link is relatively low, the first data indicating the remaining lifetime of the packet may indicate the quality of the first link. However, it is not limited thereto.

For example, the second data may indicate the remaining lifetime of a packet (e.g., the second packet to be illustrated in the description of operation 306) to be transmitted through the sub event of the second CIS event overlapped with the sub event of the first CIS event. For example, the remaining lifetime may indicate a flush point of the packet. For example, the flush point may indicate a timing or in-time at which the packet is deleted by a link layer. For example, the packet may be retransmitted until an acknowledgment signal for the packet is received or until the flush point is reached. For example, the remaining lifetime may indicate a time until a timing corresponding to the flush point of the packet. However, it is not limited thereto.

For example, since the remaining lifetime of the packet may be relatively long on a condition that the quality of the second link is relatively high, and the remaining lifetime of the packet may be relatively short on a condition that the quality of the second link is relatively low, the second data indicating the remaining lifetime of the packet may indicate the quality of the second link. However, it is not limited thereto.

For example, the first data may indicate a retransmission rate (or a state of retransmission) of at least one packet transmitted through the first CIS event. For example, since the retransmission rate is relatively low on the condition that the quality of the first link is relatively high, and the retransmission rate may be relatively high on the condition that the quality of the first link is relatively low, the first data indicating the retransmission rate may indicate the quality of the first link. However, it is not limited thereto.

For example, the second data may indicate a retransmission rate (or a state of retransmission) of at least one packet transmitted through the second CIS event. For example, since the retransmission rate is relatively low on the condition that the quality of the second link is relatively high, and the retransmission rate may be relatively high on the condition that the quality of the second link is relatively low, the second data indicating the retransmission rate may indicate the quality of the second link. However, it is not limited thereto.

For example, the first data may indicate a retransmission rate of at least one packet transmitted through a CIS event for the first external electronic device 201 in the first CIS event and another CIG event including the second CIS event. For example, the second data may indicate a retransmission rate of at least one packet transmitted through a CIS event for the second external electronic device 202 within the other CIG event.

For example, the first data may indicate a Packet Error Rate (PER) of transmission through the first CIS event. For example, the second data may indicate PER of transmission through the second CIS event.

For example, the first data may indicate the reception intensity of a signal transmitted from the electronic device 101 to the first external electronic device 201 through the first CIS event. For example, the first data may indicate reception intensity of a signal transmitted from the first external electronic device 201 to the electronic device 101 through the first CIS event.

For example, the second data may indicate the reception intensity of a signal transmitted from the electronic device 101 to the second external electronic device 202 through the second CIS event. For example, the second data may indicate reception intensity of a signal transmitted from the second external electronic device 202 to the electronic device 101 through the second CIS event. However, it is not limited thereto.

For example, the first data may indicate a Signal-to-Noise Ratio (SNR), a Signal to Interference and Noise Ratio (SINR), and/or a Bit Error Rate (BER) for communication through the first CIS event. For example, the second data may indicate SNR, SINR, and/or BER for communication through the second CIS event. For example, a timing of identifying the first data and the second data may vary according to embodiments.

For example, the processor 120 may identify the first data and the second data before starting a transmission through another sub event next to the sub event after terminating a transmission through the sub event of the first CIS event or the second CIS event. For example, the other sub event may be a sub event within a time interval in which the first CIS event and the second CIS event overlap. For example, the processor 120 may identify the first data and the second data for a transmission through the next sub event at termination of transmission through the sub event. However, it is not limited thereto.

For example, the processor 120 may identify the first data and the second data before transmissions through the CIG event are initiated in a state terminating (or completing) transmissions through another CIG events, the other CIG event prior to the CIG event including the first CIS event and the second CIS event.

For example, the processor 120 may identify the first data and the second data for a transmission through the next CIG event at the end of one CIG event. The processor 120 may identify the first data and the second data for transmission through the next CIG event at each end of a CIG event. However, it is not limited thereto.

For example, the section to which the first data and the second data are applied may vary according to embodiments. For example, the first data and the second data may be applied with respect to a CIG event. Such an example may be illustrated in FIG. 5A.

Figure 5A:
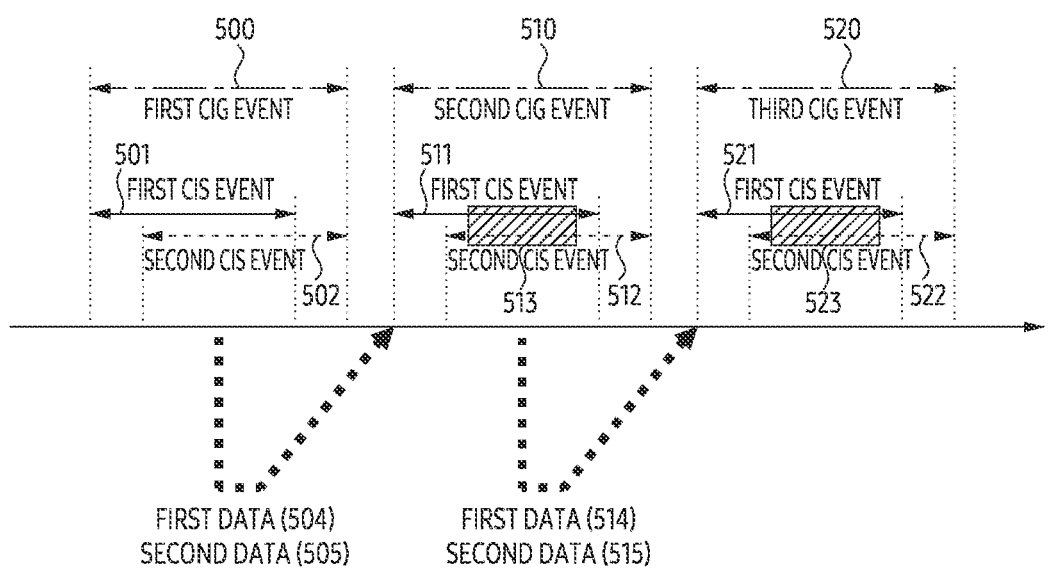
FIG. 5A illustrates an example in which first data and second data are applied to a CIG event.

FIG. 5A illustrates an example in which first data and second data are applied to a CIG event. For example, in FIG. 5A, the processor 120 may identify the first data 504 and the second data 505 based on the result (or state) of previous transmissions including the transmissions performed through the first CIG event 500 including the first CIS event 501 and the second CIS event 502 in the hybrid arrangement.

The processor 120 may apply the first data 504 and the second data 505 with respect to transmissions to be performed through the time interval 513 in the second CIG event 510 in which the first CIS event 511 and the second CIS event 512 overlap. A method of applying the first data 504 and the second data 505 to the transmissions will be illustrated in the following descriptions.

For example, the processor 120 may identify the first data 514 and the second data 515 based on the result (or state) of previous transmissions including transmissions performed through the second CIG event 510. The processor 120 may apply the first data 514 and the second data 515 with respect to transmissions to be performed through time interval 523 in the third CIG event 520 in which the first CIS event 521 and the second CIS event 522 overlap each other.

A method of applying the first data 514 and the second data 515 to the transmissions will be illustrated in the following descriptions. Referring back to FIG. 3, the first data and the second data may be applied with respect to one sub event. Such an example may be illustrated in the description of FIG. 5B.

Figure 5B:
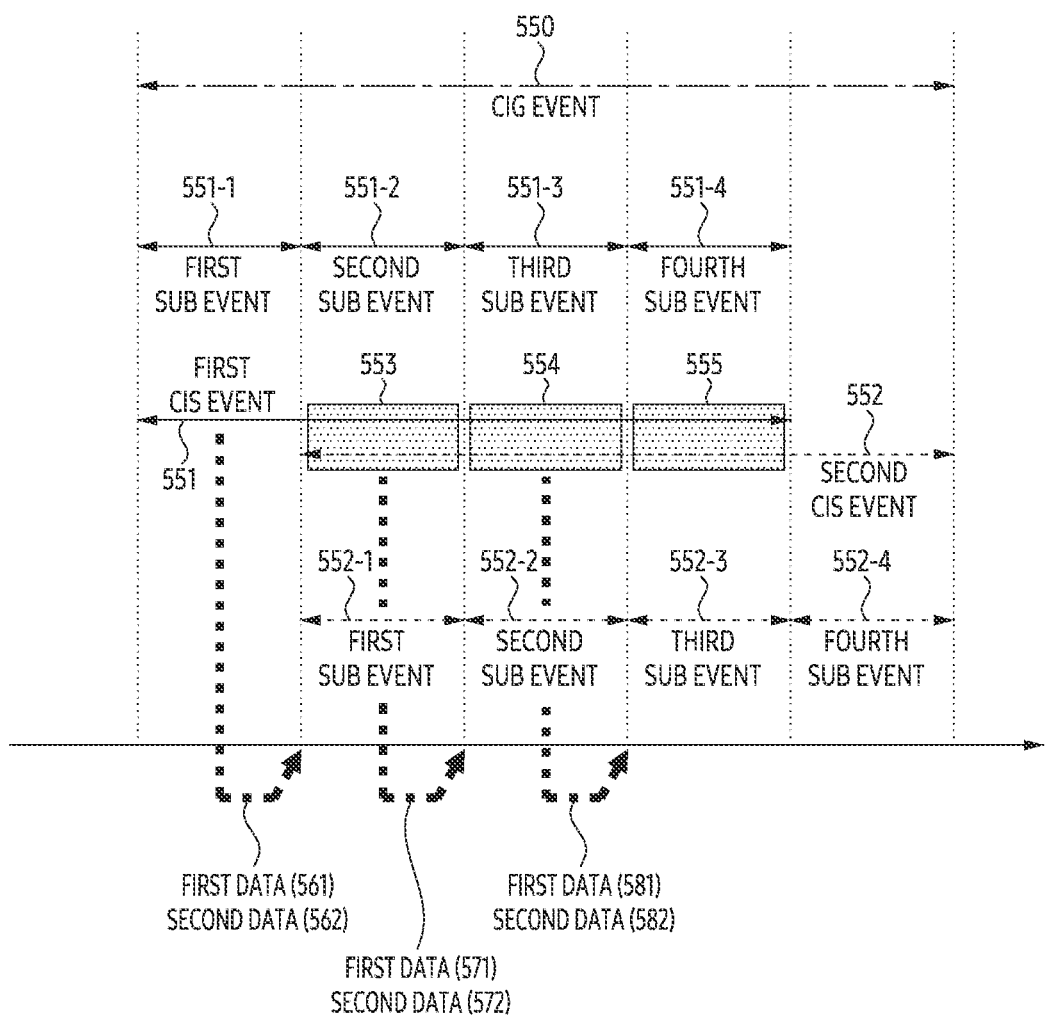
FIG. 5B illustrates an example in which first data and second data are applied to a sub event.

FIG. 5B illustrates an example in which first data and second data are applied to a sub event. For example, in FIG. 5B, the processor 120 may identify the first data 561 and the second data 562 based on the result (or state) of previous transmissions including transmissions performed through the first sub event 551-1 of the first CIS event 551 within the CIG event 550 having the hybrid arrangement. The processor 120 may apply the first data 561 and the second data 562 to a transmission to be performed through a time interval 553 in which the second sub event 551-2 of the first CIS event 551 and the first sub event 552-1 of the second CIS event 552 overlap. A method of applying the first data 561 and the second data 562 to the transmission will be illustrated in the following descriptions.

For example, the processor 120 may identify the first data 571 and the second data 572 based on the result (or state) of previous transmissions including a transmission performed through the time interval 553. The processor 120 may apply the first data 571 and the second data 572 to a transmission to be performed through the time interval 554 in which the third sub event 551-3 of the first CIS event 551 and the second sub event 552-2 of the second CIS event 552 overlap each other. A method of applying the first data 571 and the second data 572 to the transmission will be illustrated in the following descriptions.

For example, the processor 120 may identify the first data 581 and the second data 582 based on the result (or state) of previous transmissions including a transmission performed through the time interval 554. The processor 120 may apply the first data 581 and the second data 582 with respect to a transmission to be performed through a time interval 555 in which the fourth sub event 551-4 of the first CIS event 551 and the third sub event 552-3 of the second CIS event 552 overlap each other. A method of applying the first data 581 and the second data 582 to the transmission will be illustrated in the following descriptions.

Referring back to FIG. 3, in operation 306, the processor 120 may transmit a first packet or a second packet based on the first data and the second data. For example, the processor 120 may transmit the first packet to the first external electronic device 201 through the sub event of the first CIS event within the time interval in which the first CIS event and the second CIS event overlap, based on the first data and the second data, and transmit the second packet to the second external electronic device through the sub event of the second CIS event in the time interval in which at least a part of the sub event of the first CIS event is partially overlapped. For example, the processor 120 may identify a packet to be transmitted within a time interval in which at least a part of the sub event of the first CIS event and at least a part of the sub event of the second CIS event overlap among the first packet and the second packet, based on the first data and the second data. The processor 120 may transmit the identified packet.

In one example, the processor 120 may refrain from transmitting the first packet through the sub event of the first CIS event while the processor 120 may transmit the second packet through the sub event of the second CIS event based on the quality of the first link, which is higher than the quality of the second link. For example, the processor 120 may transmit the first packet through the sub event of the first CIS event, while the processor 120 may refrain from transmitting the second packet through the sub event of the second CIS event based on the quality of the first link, which is lower than the quality of the second link.

For example, the processor 120 may transmit the first packet or the second packet based on the first data indicating the number of at least one PDU temporarily stored in the first buffer and the second data indicating the number of at least one PDU temporarily stored in the second buffer. For example, the processor 120 may transmit the first packet through the sub event of the first CIS event based on the number of at least one PDU temporarily stored in the first buffer being greater that the number of at least one PDU temporarily stored in the second buffer. For example, the processor 120 may transmit the second packet through the sub event of the second CIS event based on the number of the at least one PDU at least temporarily stored in the first buffer being smaller than the number of at least one PDU at least temporarily stored in the second buffer.

For example, the processor 120 may transmit a packet through a sub event of a CIS event corresponding to a buffer storing a larger amount of data among the first buffer and the second buffer, for balance between the quality of service provided through the first CIS event and the quality of service provided through the second CIS event. For example, the processor 120 may transmit a packet through another CIS event distinguished from the CIS event used for previous transmission under a condition that the number of the at least one PDUs at least temporarily stored in the second buffer is equal to the number of the at least one PDUs at least temporarily stored in the first buffer, for the balance between the quality of the service provided through the first CIS event and the quality of the service provided through the second CIS event for the balance between the quality of the service provided through the first CIS event and the quality of the service provided through the second CIS event.

For example, the number of at least one PDU temporarily stored in the second buffer is equal to the number of at least one PDU temporarily stored in the first buffer, and the processor 120 may transmit a packet through a sub event of the second CIS event under a condition that the previous transmission was performed through the first CIS event. For example, the number of at least one PDU temporarily stored in the second buffer is equal to the number of at least one PDU temporarily stored in the first buffer, the processor 120 may transmit a packet through a sub event of the first CIS event under conditions that the previous transmission was performed through the first CIS event. For example, such transmission may be illustrated in FIG. 6.

Figure 6:
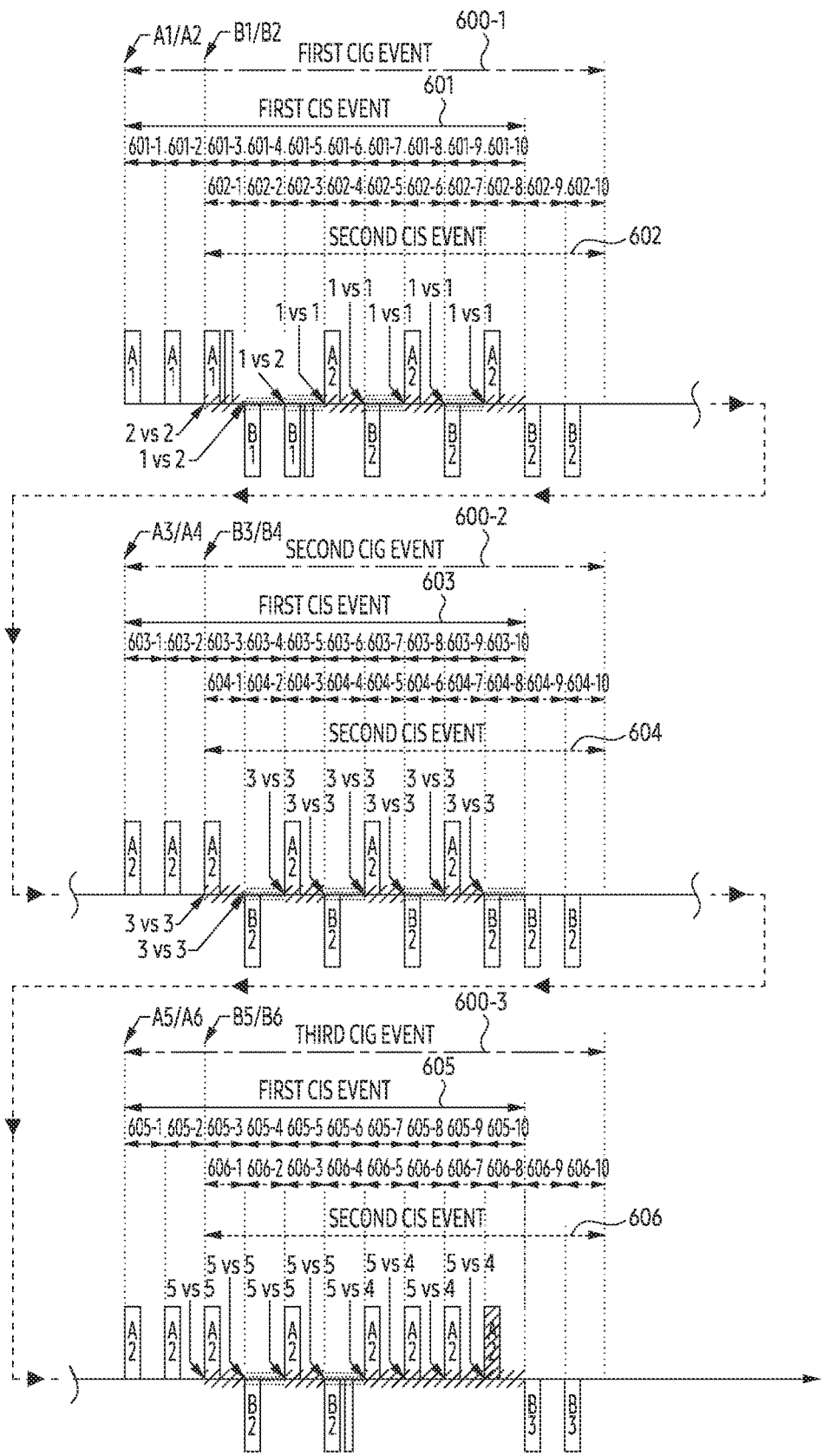
FIG. 6 illustrates an exemplary method of adaptively transmitting a packet through a CIG event having a hybrid arrangement based on first data indicating a number of at least one Protocol Data Unit (PDU) in a first buffer and second data indicating a number of at least one PDU in a second buffer.

FIG. 6 illustrates an exemplary method of adaptively transmitting a packet through a CIG event having a hybrid arrangement based on first data indicating a number of at least one protocol data unit (PDU) in a first buffer and second data indicating a number of at least one PDU in a second buffer. In FIG. 6, the first CIG event 600-1 may include the first CIS event 601 and the second CIS event 602 in the hybrid arrangement, the second CIG event 600-2 may include the first CIS event 603 and the second CIS event 604 in the hybrid arrangement, and the third CIG event 600-3 may include the first CIS event 605 and the second CIS event 606 in the hybrid arrangement. For example, in FIG. 6, each of the first CIS event 601 and the second CIS event 602; the first CIS event 603 and the second CIS event 604; the first CIS event 605 and the second CIS event 606 may include 10 sub events. For example, BN of each of the first CIS event 601, the second CIS event 602, the first CIS event 603, the second CIS event 604, the first CIS event 605, and the second CIS event 606 may be 2. For example, FT of each of the first CIS event 601, the second CIS event 602, the first CIS event 603, the second CIS event 604, the first CIS event 605, and the second CIS event 606 may be 3.

For example, each of the length of the time interval in which the first CIS event 601 and the second CIS event 602 overlap, the length of the time interval in which the first CIS event 603 and the second CIS event 604 overlap, and the length of the time interval in which the first CIS event 605 and the second CIS event 606 overlap may be identified based on the number (NSE defined within the standard) of sub events of the CIS event and the BN of the CIS event. For example, the number of sub events of the first CIS event 601 overlapped with the second CIS event 602, the number of sub events of the first CIS event 603 overlapped with the second CIS event 604, and the number of first CIS event 605 overlapping the second CIS event 606 may be 8, which is obtained by subtracting BN (e.g., 2) from NSE (e.g., 10). However, it is not limited thereto.

For example, packets scheduled or allocated for transmissions through the first CIS event 601 may be packet A1 and packet A2, packets scheduled or allocated for transmissions through the first CIS event 603 may be packet A3 and packet A4, packets scheduled or allocated for transmissions through the first CIS event 605 may be packet A5 and packet A6, packets scheduled or allocated for transmissions through the second CIS event 602 may be packet B1 and packet B2, packets scheduled or allocated for transmissions through the second CIS event 604 may be packet B3 and packet B4, and packets scheduled or allocated for transmissions through the second CIS event 606 may be packet B5 and packet B6.

For example, the processor 120 may transmit the packet A1 through each of the first sub event 601-1 of the first CIS event 601 and the second sub event 601-2 of the first CIS event 601. For example, the processor 120 may not receive an acknowledgement signal for the packet A1 from the first external electronic device 201 or may receive a non-acknowledgement signal for the packet A1 from the first external electronic device 201 through each of the first sub event 601-1 of the first CIS event 601 and the second sub event 601-2 of the first CIS event 601.

The processor 120 may identify the first data indicating that the number of the at least one PDU in the first buffer is 2 and the second data indicating that the number of the at least one PDU in the second buffer is 2, before initiating transmission through the third sub event 601-3 of the first CIS event 601 or the second CIS event 602. In a state where the number indicated by the first data (e.g., 2) and the number indicated by the second data (e.g., 2) are the same, the processor 120 may transmit the packet A1 through the third sub event 601-3 of the first CIS event 601 among the third sub event 601-3 of the first CIS event 601 and the first sub event 602-1 of the second CIS event 602.

For example, since the remaining number (e.g., 8) of transmissions through the first CIG event 601 is less than the remaining number (e.g., 10) of transmissions through the second CIS event 602, and thus the processor 120 may perform the transmission of the packet A1 through the third sub event 601-3 of the first CIS event 601. However, it is not limited thereto. Meanwhile, the processor 120 may receive an acknowledgment signal with respect to the packet A1 from the first external electronic device 201 through the third sub event 601-3 of the first CIS event 601.

The processor 120 may identify the first data indicating that the number of the at least one PDU in the first buffer is 1, and the second data indicating that the number of the at least one PDU in the second buffer is 2, before initiating transmission through the fourth sub event 601-4 of the first CIS event 601 or the second sub event 602-2 of the second CIS event 602. The processor 120 may transmit packet B1 through the second sub event 602-2 of the second CIS event 602, among the fourth sub event 601-4 of the first CIS event 601 and the second sub event 602-2 of the second CIS event 602, based on the number (e.g., 1) indicated by the first data less than the number (e.g., 2) indicated by the second data. For example, the processor 120 may not receive an acknowledgement signal for the packet B1 from the second external electronic device 202, or may receive a non-acknowledgement signal for the packet B1 from the second external electronic device 202, through the second sub event 602-2 of the second CIS event 602.

The processor 120 may identify the first data indicating that the number of the at least one PDU in the first buffer is 1, and the second data indicating that the number of the at least one PDU in the second buffer is 2, before initiating transmission through the fifth sub event 601-5 of the first CIS event 601 or the third sub event 602-3 of the second CIS event 602. The processor 120 may transmit the packet B1 through the third sub event 602-3 of the second CIS event 602, among the fifth sub event 601-5 of the first CIS event

601 and the third sub event 602-3 of the second CIS event 602, based on the number (e.g., 1) indicated by the first data less than the number (e.g., 2) indicated by the second data. For example, the processor 120 may receive an acknowledgement signal for the packet B1 from the second external electronic device 202 through the third sub event 602-3 of the second CIS event 602.

The processor 120 may identify the first data indicating that the number of the at least one PDU in the first buffer is 1, and the second data indicating that the number of the at least one PDU in the second buffer is 1, before initiating transmission through the sixth sub event 601-6 of the first CIS event 601 or the fourth sub event 602-4 of the second CIS event 602. The processor 120 may transmit the packet A2 through the sixth sub event 601-6 of the first CIS event 601, among the sixth sub event 601-6 of the first CIS event 601 and the fourth sub event 602-4 of the second CIS event 602, within a state in which the number indicated by the second data (e.g., 1) is the same as the number indicated by the first data (e.g., 1).

For example, the number indicated by the first data is the same as the number indicated by the second data, but the remaining number of transmissions through the first CIG event 601 (e.g., 5) is less than the remaining number of transmissions through the second CIS event 602 (e.g., 7), so that the processor 120 may execute the transmission through the sixth sub event 601-6 of the first CIS event 601. However, it is not limited thereto. The processor 120 may not receive an acknowledgement signal for the packet A2 from the first external electronic device 201 through the sixth sub event 601-6 of the first external electronic device 201 or may receive a non-acknowledgement signal for the packet A2 from the first external electronic device 201.

The processor 120 may identify the first data indicating that the number of the at least one PDU in the first buffer is 1, and the second data indicating that the number of the at least one PDU in the second buffer is 1, before initiating transmission through the seventh sub event 601-7 of the first CIS event 601 or the fifth sub event 602-5 of the second CIS event 602. The processor 120 may transmit the packet B2 through the fifth sub event 602-5 of the second CIS event 602, among the seventh sub event 601-7 of the first CIS event 601 and the fifth sub event 602-5 of the second CIS event 602, within a state in which the number indicated by the second data (e.g., 1) is the same as the number indicated by the first data (e.g., 1).

For example, the number indicated by the first data is the same as the number indicated by the second data, but the packet A2 was transmitted through the sixth sub event 601-6 of the first CIS event 601 in the previous transmission, so that the processor 120 execute the transmission of the packet B2 through the fifth sub event 602-5 of the second CIS event 602. For example, the remaining number of transmissions through the first CIG event 601 (e.g., 4) is less than the remaining number of transmissions through the second CIS event 602 (e.g., 6), but the packet A2 was transmitted through the sixth sub event 601-6 of the first CIS event 601 in the previous transmission, so that the processor 120 may execute the transmission of the packet B2 through the fifth sub event 602-5 of the second CIS event 602. However, it is not limited thereto. The processor 120 may not receive an acknowledgement signal for the packet B2 from the second external electronic device 202 through the fifth sub event 602-5 of the second CIS event 602, or may receive a non-acknowledgement signal for the packet B2 from the second external electronic device 202.

The processor 120 may identify the first data indicating that the number of the at least one PDU in the first buffer is 1, and the second data indicating that the number of the at least one PDU in the second buffer is 1, before initiating transmission through the eighth sub event 601-8 of the first CIS event 601 or the sixth sub event 602-6 of the second CIS event 602. The processor 120 may transmit the packet A2 through the eighth sub event 601-8 of the first CIS event 601, among the eighth sub event 601-8 of the first CIS event 601 and the sixth sub event 602-6 of the second CIS event 602, within a state in which the number indicated by the second data (e.g., 1) is the same as the number indicated by the first data (e.g., 1).

For example, the number indicated by the first data is equal to the number indicated by the second data, but the packet B2 was transmitted through the fifth sub event 602-5 of the second CIS event 602 in the previous transmission, so that the processor 120 may execute the transmission of the packet A2 through the eighth sub event 601-8 of the first CIS event 601. However, it is not limited thereto. The processor 120 may not receive an acknowledgement signal for the packet A2 from the first external electronic device 201 through the eighth sub event 601-8 of the first CIS event 601, or may receive a non-acknowledgement signal for the packet A2 from the first external electronic device 201.

The processor 120 may identify the first data indicating that the number of the at least one PDU in the first buffer is 1, and the second data indicating that the number of the at least one PDU in the second buffer is 1, before initiating transmission through the ninth sub event 601-9 of the first CIS event 601 or the seventh sub event 602-7 of the second CIS event 602. The processor 120 may transmit the packet B2 through the seventh sub event 602-7 of the second CIS event 602, among the ninth sub event 601-9 of the first CIS event 601 and the seventh sub event 602-7 of the second CIS event 602, within a state in which the number indicated by the second data (e.g., 1) is the same as the number indicated by the first data (e.g., 1).

For example, the number indicated by the first data is equal to the number indicated by the second data, but the packet A2 was transmitted through the eighth sub event 601-8 of the first CIS event 601 in the previous transmission, so that the processor 120 may execute the transmission of the packet B2 through the seventh sub event 602-7 of the second CIS event 602. However, it is not limited thereto. The processor 120 may not receive an acknowledgement signal for the packet B2 from the second external electronic device 202 through the seventh sub event 602-7 of the second CIS event 602, or may receive a non-acknowledgement signal for the packet B2 from the second external electronic device 202.

The processor 120 may identify the first data indicating that the number of the at least one PDU in the first buffer is 1, and the second data indicating that the number of the at least one PDU in the second buffer is 1, before initiating transmission through the tenth sub event 601-10 of the first CIS event 601 or the eighth sub event 602-8 of the second CIS event 602. The processor 120 may transmit the packet A2 through the tenth sub event 601-10 of the first CIS event 601, among the tenth sub event 601-10 of the first CIS event 601 and the eighth sub event 602-8 of the second CIS event 602, within a state in which the number indicated by the second data (e.g., 1) is the same as the number indicated by the first data (e.g., 1). For example, the number indicated by the first data is equal to the number indicated by the second data, but the packet B2 was transmitted through the seventh sub event 602-7 of the second CIS event 602 in the previous transmission, so that the processor 120 may execute the transmission of the packet A2 through the tenth sub event 601-10 of the first CIS event 601. However, it is not limited thereto. The processor 120 may not receive an acknowledgement signal for the packet A2 from the first external electronic device 201 through the tenth sub event 601-10 of the first CIS event 601, or may receive a non-acknowledgement signal for the packet A2 from the first external electronic device 201.

The processor 120 may transmit the packet B2 through the ninth sub event 602-9 of the second CIS event 602. For example, the processor 120 may not receive an acknowledgement signal for the packet B2 from the second external electronic device 202 through the ninth sub event 602-9 of the second CIS event 602, or may receive a non-acknowledgement signal for the packet B2 from the second external electronic device 202. The processor 120 may transmit the packet B2 through the tenth sub event 602-10 of the second CIS event 602. For example, the processor 120 may not receive an acknowledgement signal for the packet B2 from the second external electronic device 202 through the tenth sub event 602-10 of the second CIS event 602, or may receive a non-acknowledgement signal for the packet B2 from the second external electronic device 202.

The processor 120 may execute transmissions within a time interval in which the third sub event 603-3 to the tenth sub event 603-10 of the first CIS event 603 in the second CIG event 600-2 and the first sub event 604-1 to the eighth sub event 604-8 of the second CIS event 604 in the second CIG event 600-2 overlap each other, as a method corresponding to executing transmissions within a time interval in which the third sub event 601-3 to the tenth sub event 601-10 of the first CIS event 601 in the first CIG event 600-1 and the first sub event 602-1 to the eighth sub event 602-8 of the second CIS event 602 in the first CIG event 600-1 overlap each other.

The processor 120 may execute transmissions within a time interval in which the third sub event 603-5 to the tenth sub event 603-10 of the first CIS event 605 in the third CIG event 600-3 and the first sub event 606-1 to the eighth sub event 606-8 of the second CIS event 606 in the second CIG event 600-3 overlap each other, as a method corresponding to executing transmissions within a time interval in which the third sub event 601-3 to the tenth sub event 601-10 of the first CIS event 601 in the first CIG event 600-1 and the first sub event 602-1 to the eighth sub event 602-8 of the second CIS event 602 in the first CIG event 600-1 overlap each other. The FT of the first CIS event 601, the first CIS event 603, and the first CIS event 605 is 3, and the acknowledgement signal for the packet A2 was not received until the end of the first CIS event 605 in the third CIG event 600-3, so that the packet A2 may be flushed in response to the end of the first CIS event 605 or the end of the third CIG event 600-3.

As described above, the number (e.g., 8) of transmissions through the first CIS event 605 in the third CIG event 600-3 may be different from the number (e.g., 6) of transmissions through the first CIS event 601 in the first CIG event 600-1 and the number (e.g., 6) of transmissions through the first CIS event 603 in the second CIG event 600-2, respectively. For example, based on the quality of the first link and the quality of the second link, the electronic device 101 may adaptively change the number of transmissions through the first CIS event (e.g., the first CIS event 601, the first CIS event 603, or the first CIS event 605) and the number of transmissions through the second CIS event (e.g., the second CIS event 602, the second CIS event 604, or the second CIS event 606).

For example, the electronic device 101 may execute such an adaptive change using the hybrid arrangement to balance the quality of a service provided through the first CIS event and the quality of a service provided through the second CIS event. For example, the electronic device 101 may adaptively change the number of transmissions through the first CIS event and the number of transmissions through the second CIS event by using the hybrid arrangement based on the quality of the first link and the quality of the second link, unlike the sequential arrangement and the interleave arrangement, where the number of transmissions of the first CIS event and the number of transmissions of the second CIS event are fixed regardless of the quality of the first link and the quality of the second link.

As described above, the position of at least a part of the time resources used for transmissions through the first CIS event 601 in the first CIG event 600-1 may be different from the position of at least a part of the time resources used for transmissions through the first CIS event 603 in the second CIG event 600-2, and the position of at least a part of the time resources used for transmissions through the first CIS event 605 in the third CIG event 600-3, respectively. For example, the electronic device 101 may adaptively change the position of time resources used for transmissions through the first CIS event and the position of time resources used for transmissions through the second CIS event by using the hybrid arrangement based on the quality of the first link and the quality of the second link, unlike the sequential arrangement and interleave arrangement, where the position of the time resources used for transmissions through the first CIS event and the position of the time resources used for transmissions through the second CIS event are fixed regardless of the change in the quality of the first link and the change in the quality of the second link.

For example, in a case that a service provided through the CIG event including the first CIS event and the second CIS event in the hybrid arrangement is a service that provides music using the first external electronic device 201 and the second external electronic device 202, the electronic device 101 may provide enhanced synchronization between the first audio output through the first external electronic device 201 and the second audio output through the second external electronic device 202, rather than the sequential arrangement and interleave arrangement.

Referring back to FIG. 3, the processor 120 may transmit the first packet or the second packet based on the first data indicating the remaining lifetime of the first packet and the second data indicating the remaining lifetime of the second packet. For example, the processor 120 may identify the first data indicating the remaining lifetime of the first packet and the second data indicating the remaining lifetime of the second packet, after transmitting a packet to the first external electronic device 201 or the second external electronic device 202, through one of another sub event of the first CIS event previous to the sub event of the first CIS event that can be (or is capable of being) used for transmission of the first packet, or another sub event of the second CIS event previous to the sub event of the second CIS event that can be (or is capable of being) used for transmission of the second packet. For example, the packet transmitted through the other sub event of the first CIS event or the other sub event of the second CIS event may be the first packet, the second packet, or a different packet from the first packet and the second packet.

For example, the processor 120 may transmit the second packet through the sub event of the second CIS event based on the remaining lifetime of the first packet longer than the remaining lifetime of the second packet. For example, the processor 120 may transmit the first packet through the sub event of the first CIS event based on the remaining lifetime of the first packet shorter than the remaining lifetime of the second packet. For example, such transmission may be illustrated in FIG. 7.

Figure 7:
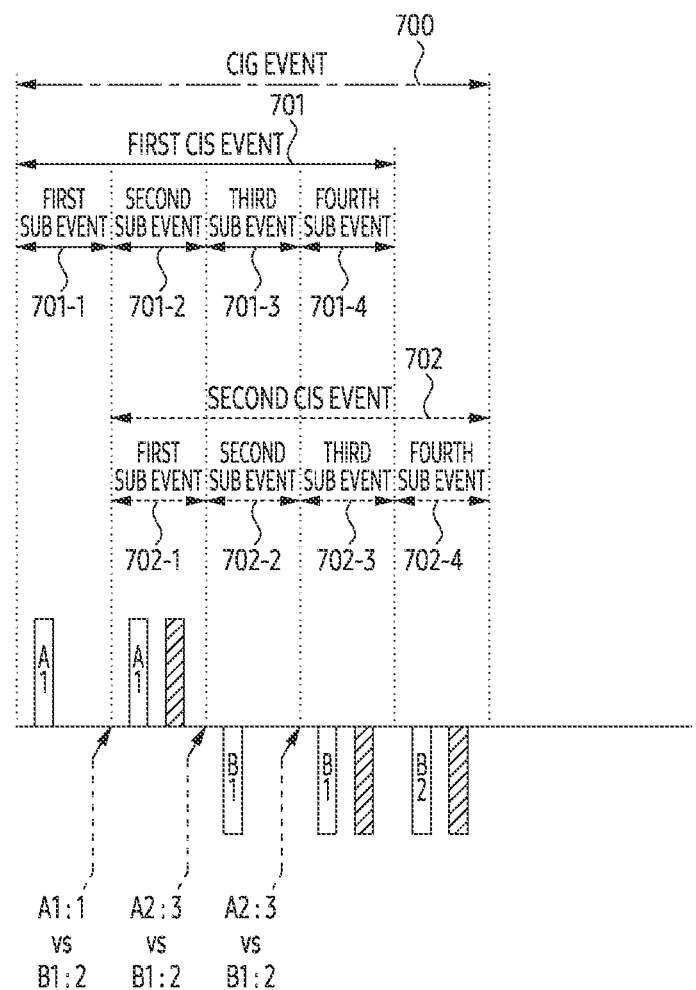
FIG. 7 illustrates an exemplary method of adaptively transmitting a packet through a CIG event having a hybrid arrangement based on first data indicating remaining lifetime of a first packet and a second data indicating remaining lifetime of a second packet.

FIG. 7 illustrates an exemplary method of adaptively transmitting a packet through a CIG event having a hybrid arrangement based on first data indicating remaining lifetime of a first packet and a second data indicating remaining lifetime of a second packet.

In FIG. 7, the CIG event 700 may include the first CIS event 701 and the second CIS event 702 in the hybrid arrangement. For example, the first CIS event 701 may include a first sub event 701-1 to a fourth sub event 701-4. For example, the second CIS event 702 may include a first sub event 702-1 to a fourth sub event 702-4. For example, the second sub event 701-2 to the fourth sub event 701-4 may overlap the first sub event 702-1 to the third sub event 702-3, respectively. For example, the BN of each of the first CIS event 701 and the second CIS event 702 may be 2. For example, the FT of each of the first CIS event 701 and the second CIS event 702 may be 3.

For example, the processor 120 may transmit the packet A1 to the first external electronic device 201 through the first sub event 701-1 of the first CIS event 701. For example, the processor 120 may not receive an acknowledgement signal for the packet A1 from the first external electronic device 201 through the first sub event 701-1 of the first CIS event 701, or may receive a non-acknowledgement signal for the packet A1 from the first external electronic device 201.

The processor 120 may identify the first data indicating that the remaining lifetime of the packet A1 to be transmitted through the second sub event 701-2 of the first CIS event 701 is 1, and the second data indicating that the remaining lifetime of the packet B1 to be transmitted through the first sub event 702-1 of the second CIS event 702 is 2, before initiating transmission through the second sub event 701-2 of the first CIS event 701 or the first sub event 702-1 of the second CIS event 702. For example, if the remaining lifetime of the packet A1 is 1, it may indicate that the packet A1 is flushed in response to the end of the first CIS event 701 or the end of the CIG event 700.

For example, if the remaining lifetime of packet B1 is 2, it may indicate that packet B1 is flushed in response to the end of a CIG event next to the CIG event 700, or the end of the second CIS event in the CIG event next to the CIG event 700. For example, the processor 120 may transmit the packet A1 to the first external electronic device 201 through the second sub event 701-2 of the first CIS event 701, among the second sub event 701-2 of the first CIS event 701 and the first sub event 702-1 of the second CIS event 702, based on the remaining lifetime of the packet A1 shorter than the remaining lifetime of the packet B1. For example, the processor 120 may receive an acknowledgement signal for the packet A1 from the first external electronic device 201 through the second sub event 701-2 of the first CIS event 701.

The processor 120 may identify the first data indicating that the remaining lifetime of the packet A2 to be transmitted through the third sub event 701-3 of the first CIS event 701 is 3, and the second data indicating that the remaining lifetime of the packet B1 to be transmitted through the second sub event 702-2 of the second CIS event 702 is 2, before initiating transmission through the third sub event 701-3 of the first CIS event 701, or the second sub event 702-2 of the second CIS event 702.

For example, the processor 120 may transmit the packet B1 to the second external electronic device 202 through the second sub event 702-2 of the second CIS event 702, among the third sub event 701-3 of the first CIS event 701 and the second sub event 702-2 of the second CIS event 702, based on the remaining lifetime of the packet A2 longer than the remaining lifetime of packet B1. For example, the processor 120 may not receive an acknowledgement signal for the packet B1 from the second external electronic device 202 through the second sub event 702-2 of the second CIS event 702, or may receive a non-acknowledge signal for the packet B1 from the second external electronic device 202 through the second sub event 702-2 of the second CIS event 702.

The processor 120 may identify the first data indicating that the remaining lifetime of the packet A2 to be transmitted through the fourth sub event 701-4 of the first CIS event 701 is 3, and the second data indicating that the remaining lifetime of the packet B1 to be transmitted through the third sub event 702-3 of the second CIS event 702 is 2, before initiating transmission through the fourth sub event 701-4 of the first CIG event 701 or the third sub event 702-3 of the second CIS event 702.

For example, the processor 120 may transmit the packet B1 to the second external electronic device 202 through the third sub event 702-3 of the second CIS event 702, among the fourth sub event 701-4 of the first CIS event 701 and the third sub event 702-3 of the second CIS event 702, based on the remaining lifetime of the packet A2 longer than the remaining lifetime of packet B1. For example, the processor 120 may receive an acknowledgement signal for the packet B1 from the second external electronic device 202 through the third sub event 702-3 of the second CIS event 702.

The processor 120 may transmit the packet B2 to the second external electronic device 202 through the fourth sub event 702-4 of the second CIS event 702. The processor 120 may receive an acknowledgment signal for the packet B2 from the second external electronic device 202 through the fourth sub event 702-4 of the second CIS event 702.

The processor 120 may identify one sub event of the sub event of the first CIS event 701 and the sub event of the second CIS event 702 through different conditions (or different standard), based on identifying that the remaining lifetime of the packet to be transmitted through the sub event of the first CIS event 701 is the same as the remaining lifetime of the packet to be transmitted through the sub event of the second CIS event 702.

For example, the processor 120 may identify one sub event of the sub event of the first CIS event 701 and the sub event of the second CIS event 702, based on the other standards illustrated in the description of FIG. 6. For example, the processor 120 may identify one sub event of the sub event of the first CIS event 701 and the sub event of the second CIS event 702, based on the comparison between the remaining number of transmissions through the first CIS event 701 and the remaining number of transmissions through the second CIS event 702. For example, the processor 120 may identify one sub event of the sub event of the first CIS event 701 and the sub event of the second CIS event 702, based on whether the sub event used for the previous transmission is another sub event of the first CIS event 701 or another sub event of the second CIS event 702. However, it is not limited thereto.

As described above, the electronic device 101 may compare the remaining lifetime of the packet to be transmitted through the first CIS event with the remaining lifetime of the packet to be transmitted through the second CIS event. By this comparison, the electronic device 101 may reduce flushing of packets transmitted to the first external electronic device 201 and flushing of packets transmitted to the second external electronic device 202. For example, the electronic device 101 may execute the comparison so that the number of times a packet is transmitted through a link having a relatively low quality increases.

Referring back to FIG. 3, the first packet and the second packet may vary according to embodiments. For example, as illustrated in the description of FIGS. 6 to 7, each of the first packet and the second packet may include data to be used within each of the first external electronic device 201 and the second external electronic device 202. For example, each of the first packet and the second packet may be a packet for transmitting audio data or a packet for retransmitting the audio data.

For example, each of the first packet and the second packet may be a dummy packet or a null packet. For example, the first packet, which is the null packet, may request the electronic device 101 to transmit a third packet including data to be used in the electronic device 101 or to request the electronic device 101 to retransmit the third packet. For example, the data in the third packet may be audio data obtained through a microphone of the first external electronic device 201. However, it is not limited thereto.

For example, the second packet, which is the null packet, may request the electronic device 101 to transmit a fourth packet including data to be used in the electronic device 101 or to request the electronic device 101 to retransmit the fourth packet. For example, the data in the fourth packet may be audio data obtained through the microphone of the second external electronic device 202. However, it is not limited thereto. For example, the first packet that is the null packet, the second packet that is the null packet, the third packet, and the fourth packet may be exemplified in the description of FIG. 8.

Figure 8:
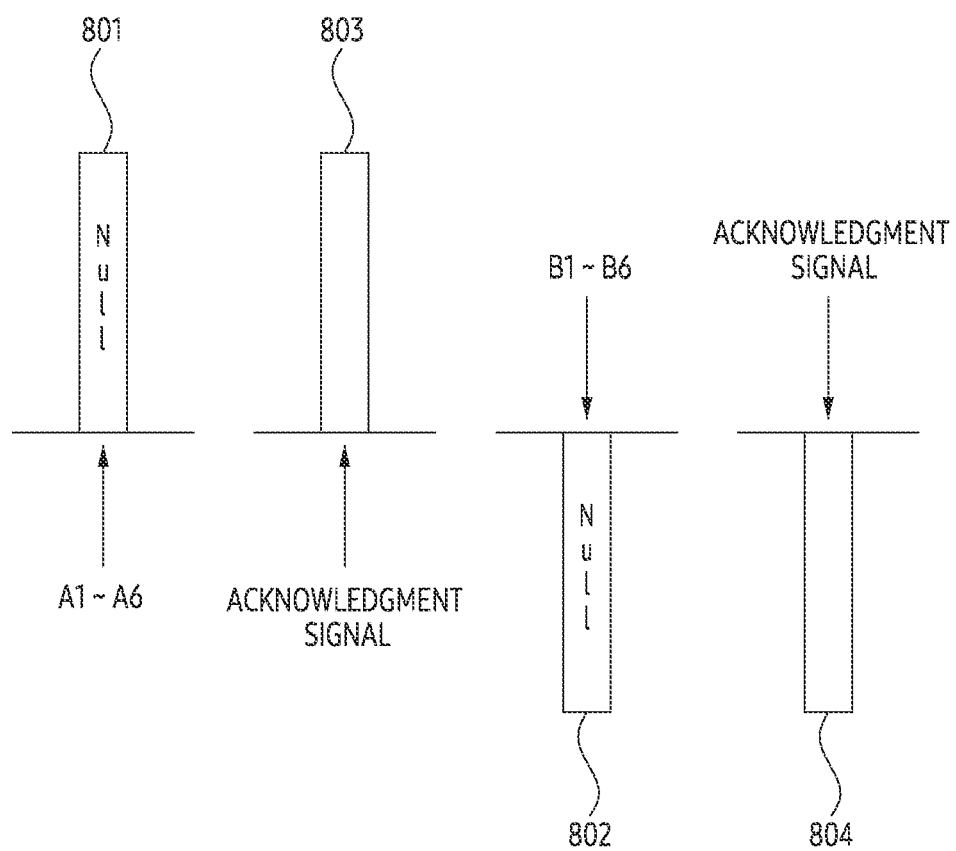
FIG. 8 illustrates examples of a first packet, a second packet, a third packet, and a fourth packet.

FIG. 8 illustrates examples of a first packet, a second packet, a third packet, and a fourth packet. In FIG. 8, the first packet 801, which is a null packet, may replace packets A1 to A6 exemplified in the description of FIG. 6. For example, in a case that the electronic device 101 obtains data from the first external electronic device 201, the processor 120 may transmit packets such as a first packet 801 to the first external electronic device 201 instead of packets A1 to A6. The first packet 801, which is the null packet, may replace the packet A1 and the packet A2 illustrated in the description of FIG. 7. For example, in a case that the electronic device 101 obtains data from the first external electronic device 201, the processor 120 may transmit a packet such as the first packet 801 to the first external electronic device 201 instead of packets A1 and A2.

The second packet 802, which is the null packet, may replace packets B1 to B6 illustrated in the description of FIG. 6. For example, in a case that the electronic device 101 obtains data from the second external electronic device 202, the processor 120 may transmit a packet such as a second packet 802 to the second external electronic device 202 instead of packets B1 to B6. The second packet 802, which is the null packet, may replace the packet B1 and the packet B2 illustrated in the description of FIG. 7. For example, in a case that the electronic device 101 obtains data from the second external electronic device 202, the processor 120 may transmit a packet such as the second packet 802 to the second external electronic device 202 instead of packets B1 and B2.

The third packet 803 is a response packet for a request through the first packet 801, and may include data obtained by the first external electronic device 201. For example, the third packet 803 may replace the acknowledgment signal illustrated in the description of FIG. 6. For example, the first external electronic device 201 may transmit the third packet 803 to the electronic device 101 in response to the first packet 801 received from the electronic device 101. For example, the third packet 803 may replace the acknowledgment signal illustrated in the description of FIG. 7. For example, the first external electronic device 201 may transmit the third packet 803 to the electronic device 101 in response to the first packet 801 received from the electronic device 101.

The fourth packet 804 is a response packet for a request through the second packet 802, and may include data obtained by the second external electronic device 202. For example, the fourth packet 804 may replace the acknowledgment signal illustrated in the description of FIG. 6. For example, the second external electronic device 202 may transmit the fourth packet 804 to the electronic device 101 in response to the second packet 802 received from the electronic device 101. For example, the fourth packet 804 may replace the acknowledgment signal illustrated in the description of FIG. 7. For example, the second external electronic device 202 may transmit the fourth packet 804 to the electronic device 101 in response to the second packet 802 received from the electronic device 101.

The above-described examples and examples below illustrate that the electronic device 101 provides data to each of the first external electronic device 201 and second external electronic device 202 within a CIG event including a first CIS event, and a second CIS event at least partially overlapped with at least a part of the first CIS event, and that each of the first external electronic device 201 and the second external electronic device 202 provides data to the electronic device 101 within a CIG event including a first CIS event, and a second CIS event at least partially overlapped with at least a part of the first CIS event.

In an embodiment, the electronic device 101 (or the processor 120) may execute providing data to each of the first external electronic device 201 and the second external electronic device 202, or obtaining data from each of the first external electronic device 201 and the second external electronic device 202 within a CIG event including a first CIS event, and a second CIS event at least partially overlapped with at least a part of the first CIS event. For example, the processor 120 may execute an adaptive transmission through the CIG event, based on a number of at least one packet in the buffer to be transmitted to the first external electronic device 201, the remaining lifetime of the packet to be received from the first external electronic device 201, a number of at least one packet in the buffer to be transmitted to the second external electronic device 202, and the remaining lifetime of the packet to be received from the second external electronic device 202. However, it is not limited thereto.

Figure 9A:
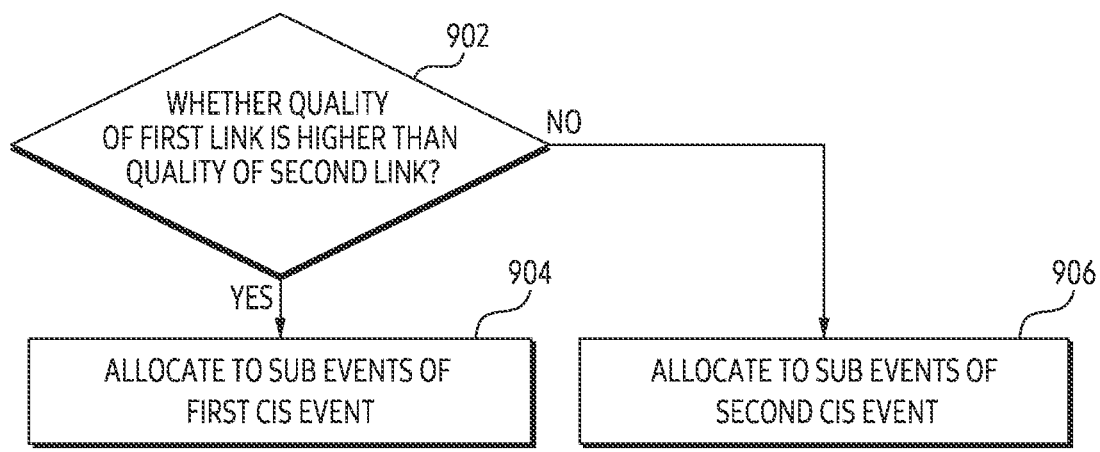
FIG. 9A illustrates an exemplary method of allocating all of a time interval in which a first CIS (connected isochronous stream) event and a second CIS event overlap in a CIG event having a hybrid arrangement, based on quality of a first link and quality of a second link, to one CIS event of the first event and second CIS event.

FIG. 9A illustrates an exemplary method of allocating all of a time interval in which a first CIS event and a second CIS event overlap in a CIG event having a hybrid arrangement, based on quality of a first link and quality of a second link, to one CIS event of the first event and second CIS event. The method may be executed by the electronic device 101 or the processor 120 of the electronic device 101 illustrated in FIG.

1. In an embodiment, operations 902 to 906 of FIG. 9A may be included in operation 306 of FIG. 3. In an embodiment, operations 902 to 906 of FIG. 9A may be an example of operation 306 of FIG. 3.

In FIG. 9A, in operation 902, the processor 120 may compare the quality of the first link with the quality of the second link. For example, the processor 120 may compare the quality of the first link with the quality of the second link by comparing the first data with the second data. For example, the processor 120 may execute operation 904 on a condition that the quality of the first link is higher than the quality of the second link. For example, the processor 120 may execute operation 906 on a condition that the quality of the first link is lower than the quality of the second link.

In operation 904, the processor 120 may allocate or schedule all of the time intervals in the CIG event where the first CIS event and the second CIS event overlap to the first CIS event among the first CIS event and the second CIS event, based on the quality of the first link higher than the quality of the second link. For example, in a case that a service with an FT of 1 is provided through the CIG event including the first CIS event and the second CIS event, such as a telephone call, or in a case that a service is provided that requires reducing packet missing through the CIG event including the first CIS event and the second CIS event, even when an imbalance between the first CIS event and the second CIS event occurs, the processor 120 may allocate all of the time intervals to the first CIS event based on identifying (by the processor 120) that the quality of the first link is higher than the quality of the second link.

The processor 120 may transmit at least one packet including the first packet through at least a part of the sub events of the first CIS event in the time interval based on the allocation. Allocating all of the time intervals to the first CIS event may be illustrated in the description of FIG. 9B.

Figure 9B:
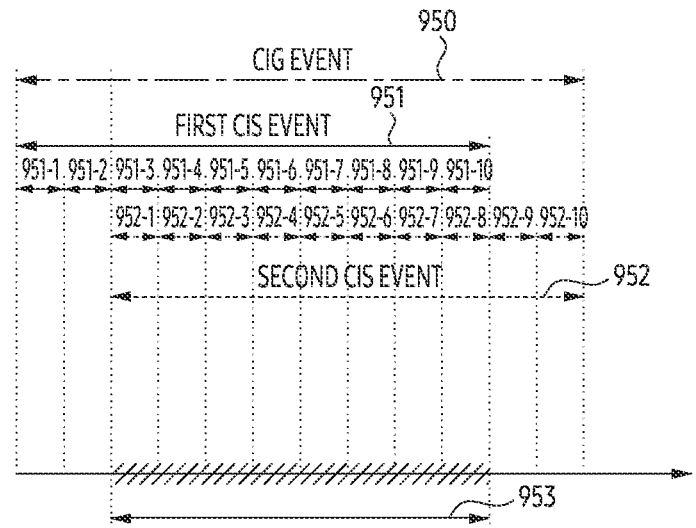
FIG. 9B illustrates an exemplary method of allocating all of a time interval in which a first CIS event and a second CIS event overlap in a CIG event having a hybrid arrangement, based on quality of a first link and quality of a second link, to one CIS event of the first event and second CIS event.
Figure 9B:
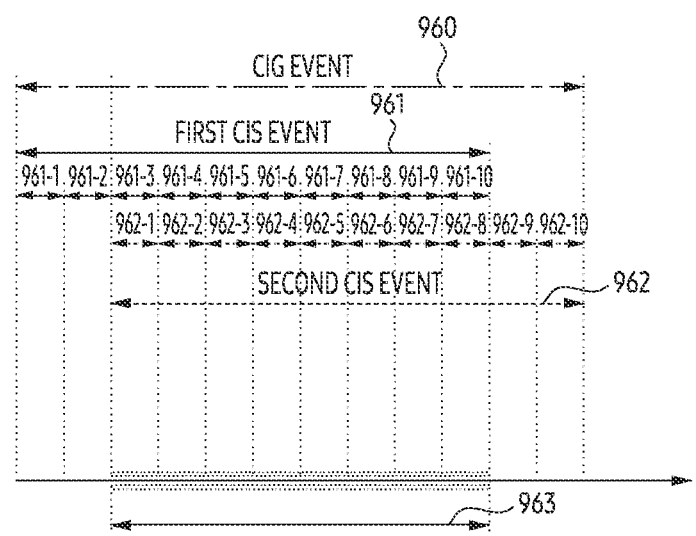

FIG. 9B illustrates an exemplary method of allocating all of a time interval in which a first CIS event and a second CIS event overlap in a CIG event having a hybrid arrangement, based on quality of a first link and quality of a second link, to one CIS event of the first event and second CIS event.

In FIG. 9B, the CIG event 950 may include the first CIS event 951 and the second CIS event 952 in the hybrid arrangement. For example, the first CIS event 951 may include a first sub event 951-1 to a tenth sub event 951-10 and the second CIS event 952 may include a first sub event 952-1 to a tenth sub event 952-10. For example, the third sub event 951-3 to the tenth sub event 951-10 of the first CIS event 951 may overlap the first sub event 952-1 to the eighth sub event 952-8 of the second CIS event 952, respectively.

For example, the processor 120 may identify that the quality of the first link is higher than the quality of the second link based on the state (or result) of transmissions through another CIG event previous to the CIG event 950. Based on the identification, the processor 120 may allocate all of the time intervals 953 in which the first CIS event 951 and the second CIS event 952 overlap each other to the third sub event 951-3 to the tenth sub event 951-10 of the first CIS event 951. For example, the processor 120 may transmit the at least one packet including the first packet through at least a part of the third sub event 951-3 to the tenth sub event 951-10 of the first CIS event 951.

In an embodiment, when all packets targeted to be transmitted through the first CIS event 951 are transmitted before end of the first CIS event 951, the processor 120 may use the remaining part of the time interval 953 for transmission through the second CIS event 952. For example, when transmissions of all the packets are completed through transmissions through the sixth sub event 951-6 of the first CIS event 951, the processor 120 may transmit at least one packet including the second packet to the second external electronic device 202 through the fifth sub event 952-5 to the eighth sub event 952-8 of the second CIS event 952 overlapping with the seventh sub event 951-7 to the tenth sub event 951-10 of the first CIS event 951, respectively. However, it is not limited thereto.

Referring back to FIG. 9A, in operation 906, the processor 120 may allocate or schedule all of the time intervals in the CIG event in which the first CIS event and the second CIS event overlap to the second CIS event, among the first CIS event and the second CIS event, based on the quality of the first link lower than the quality of the second link. For example, in case that a service with an FT of 1 is provided through the CIG event including the first CIS event and the second CIS event, such as a telephone call, or in case that a service is provided that requires reducing packet missing through the CIG event including the first CIS event and the second CIS event, even when an imbalance between the first CIS event and the second CIS event occurs, the processor 120 may allocate all of the time intervals to the second CIS event, based on identifying that the quality of the second link is higher than the quality of the first link.

The processor 120 may transmit at least one packet including the second packet through at least a part of the sub events of the second CIS event in the time interval based on the allocation. Allocating all of the time intervals to the second CIS event may be illustrated in the description of FIG. 9B.

In FIG. 9B, the CIG event 960 may include the first CIS event 961 and the second CIS event 962 in the hybrid arrangement. For example, the first CIS event 961 may include a first sub event 961-1 to a tenth sub event 961-10 and the second CIS event 962 may include a first sub event 962-1 to a tenth sub event 962-10. For example, the third sub event 961-3 to the tenth sub event 961-10 of the first CIS event 961 may overlap the first sub event 962-1 to the eighth sub event 962-8 of the second CIS event 962, respectively.

For example, the processor 120 may identify that the quality of the second link is higher than the quality of the first link, based on a state (or a result) of transmissions through another CIG event previous to the CIG event 960. Based on the identification, the processor 120 may allocate all of the time intervals 963 in which the first CIS event 961 and the second CIS event 962 overlap to the first sub event 962-1 to the eighth sub event 962-8 of the second CIS event 962. For example, the processor 120 may transmit the at least one packet including the second packet through at least a part of the first sub event 962-1 to the eighth sub event 962-8 of the second CIS event 962.

In an embodiment, when all packets targeted for transmission through the second CIS event 962 are transmitted through at least one sub event (e.g., at least one of the first sub event 962-1 to the tenth sub event 962-10) of the second CIS event 962 included in a part of the time interval 963, the processor 120 may use the remaining part of the time intervals 963 for transmission through the first CIS event 961. For example, when transmissions of all the packets are completed through transmissions in the third sub event 962-3 of the second CIS event 962, the processor 120 may transmit at least one packet including the first packet to the first external electronic device 201 through the sixth sub event 961-6 to the tenth sub event 961-10 of the first CIS event 961 overlapping with the fourth sub event 962-4 to the eighth sub event 962-8 of the second CIS event 962, respectively. However, it is not limited thereto.

The processor 120 may allocate the time interval in which the first CIS event and the second CIS event overlap, on a condition that the quality of the first link corresponds to the quality of the second link, based on another condition. For example, the processor 120 may allocate the time interval, based on a state of the first buffer and a state of the second buffer, a remaining lifetime of the first packet and a remaining lifetime of the second packet, a remaining number of times of transmission through the first CIS event and a remaining number of times of transmission through the second CIS event, and/or the CIS event used in the previous transmission.

As described above, when it is required to reduce missing packets, even if an imbalance occurs between the quality of service provided through the first CIS event and the quality of service provided through the second CIS event, the electronic device 101 may increase the number of times of transmissions through a link having a high quality among the first link and the second link, by using the hybrid arrangement.

Figure 10A:
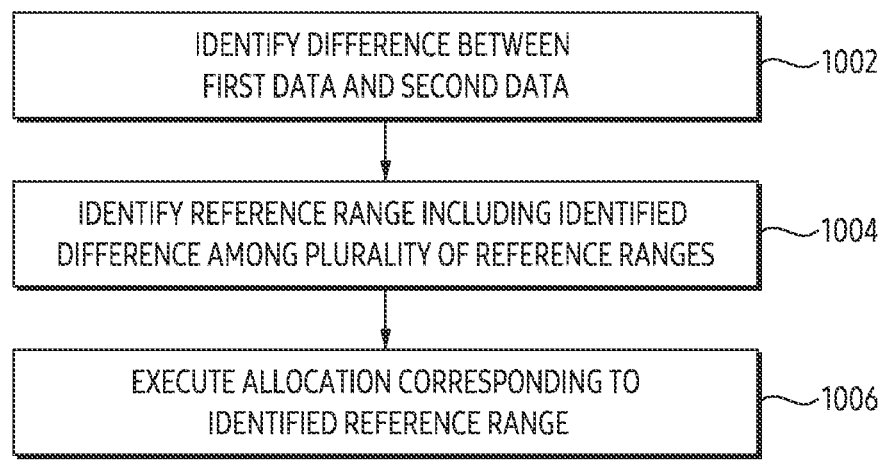
FIG. 10A illustrates an exemplary method of executing an allocation corresponding to a reference range including a difference between first data and second data for a CIG event with a hybrid arrangement.

FIG. 10A illustrates an exemplary method of executing an allocation corresponding to a reference range including a difference between first data and second data for a CIG event with a hybrid arrangement. The method may be executed by the electronic device 101 or the processor 120 of the electronic device 101 illustrated in FIG. 1. In an embodiment, operations 1002 to 1006 of FIG. 10A may be included in operation 306 of FIG. 3.

In FIG. 10A, in operation 1002, the processor 120 may identify a difference between the first data and the second data. For example, the processor 120 may identify the difference between the first data and the second data to adaptively execute a method of allocating a time interval in which the first CIS event and the second CIS event overlap, according to a difference between the quality of the first link and the quality of the second link.

In operation 1004, the processor 120 may identify a reference range including the difference among a plurality of reference ranges. For example, the plurality of reference ranges may be expressed as shown in Table 1 below.

TABLE 1

| In a case that quality of first link is greater than or equal to quality of second link | ... Kth reference range mth reference range ... | ... a1~a2 a2~a3 ... |
|---|---|---|
| In a case that quality of first link is less than quality of second link | ... lth reference range nth reference range ... | ... a1~a2 a2~a3 ... |

In Table 1, k may be a natural number of 1 or more, m may be a natural number greater than k, 1 may be a natural number of 1 or more, and n may be a natural number greater than 1. In Table 1, each of a1, a2, and a3 may be a real number.

For example, the processor 120 may identify the mth reference range illustrated in Table 1 as the reference range on a condition that the quality of the first link is higher than the quality of the second link and the difference is between a2 and a3. For example, the processor 120 may identify the 1th reference range illustrated in Table 1 as the reference range on a condition that the quality of the second link is lower than the quality of the second link and the difference is a value between a1 and a2. However, it is not limited thereto.

In operation 1006, the processor 120 may execute allocation corresponding to the identified reference range. For example, the processor 120 may execute the allocation corresponding to the reference range among a plurality of predetermined respectively allocations defined for the plurality of reference ranges. For example, the allocation may be illustrated in FIG. 10B.

Figure 10B:
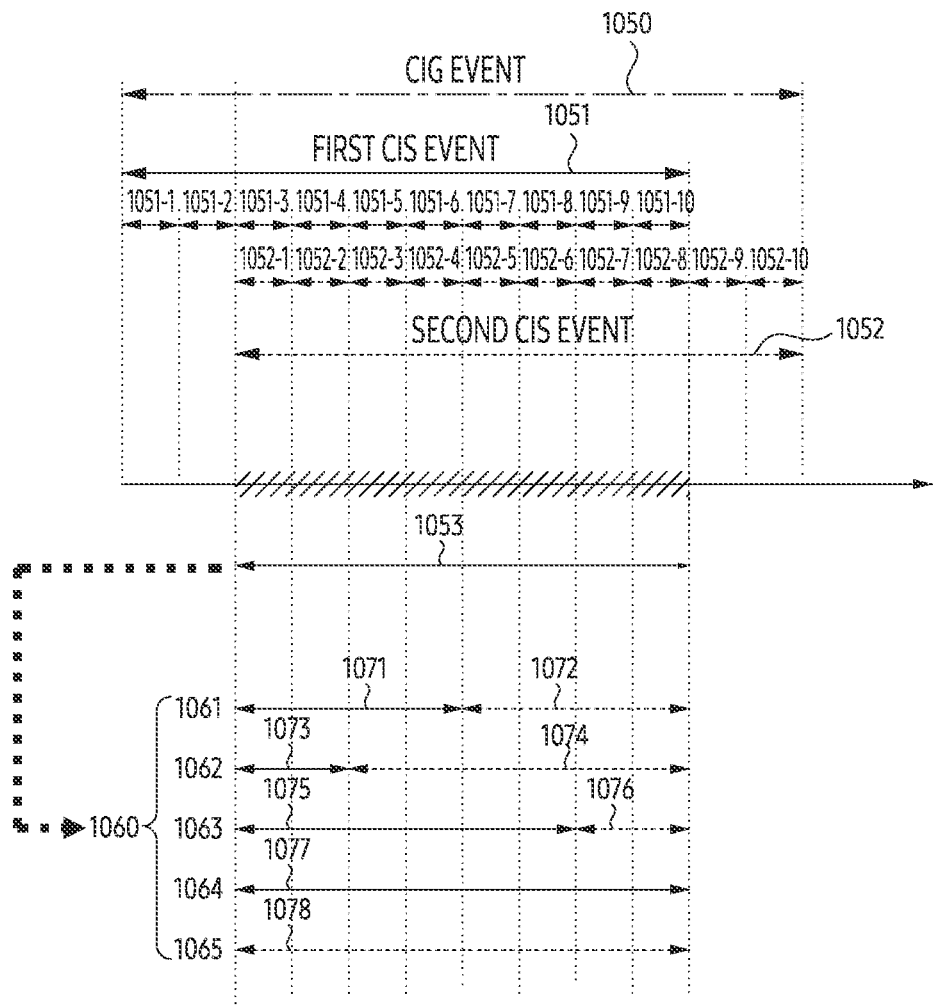
FIG. 10B illustrates an example of a plurality of predetermined allocations corresponding respectively to a plurality of reference ranges.

FIG. 10B illustrates an example of a plurality of predetermined allocations corresponding respectively to a plurality of reference ranges. In FIG. 10B, a CIG event 1050 may include a first CIS event 1051 including a first sub event 1051-1 to a tenth sub event 1051-10 and a second CIS event 1052 including a first sub event 1052-1 to tenth sub event 1052-10 in the hybrid arrangement. For example, the third sub event 1051-3 to the tenth sub event 1051-10 of the first CIS event 1051 may overlap the first sub event 1052-1 to the eighth sub event 1052-8 of the second CIS event 1052, respectively.

For example, the processor 120 may identify a first allocation 1061 corresponding to a first reference range among a plurality of predetermined allocations 1060, on a condition that the reference range including the identified difference is the first reference range. For example, the first allocation 1061 may be to allocate the first part 1071 of the time interval 1053 to the third sub event 1051-3 to the sixth sub event 1051-6 of the first CIS event 1051, and the second part 1072 of the time interval 1053 to the fifth sub event 1052-5 to the eighth sub event 1052-8 of the second CIS event 1052. However, it is not limited thereto.

For example, the processor 120 may identify a second allocation 1062 corresponding to a second reference range among the plurality of predetermined allocations 1060, on a condition that the reference range including the identified difference is the second reference range. For example, the second allocation 1062 may allocate the third part 1073 of the time interval 1053 to the third sub event 1051-3 to the fourth sub event 1051-4 of the first CIS event 1051, and the fourth part 1074 of the time interval 1053 to the third sub event 1052-3 to the eighth sub event 1052-8 of the second CIS event 1052. However, it is not limited thereto.

For example, the processor 120 may identify a third allocation 1063 corresponding to a third reference range among the plurality of predetermined allocations 1060, on a condition that the reference range including the identified difference is the third reference range. For example, the third allocation 1063 may be to allocate the fifth part 1075 of the time interval 1053 to the third sub event 1051-3 to the eighth sub event 1051-8 of the first CIS event 1051, and the sixth part 1076 of the time interval 1053 to the seventh sub event 1052-7 to the eighth sub event 1052-8 of the second CIS event 1052. However, it is not limited thereto.

For example, the processor 120 may identify a fourth allocation 1064 corresponding to a fourth reference range among the plurality of predetermined allocations 1060, on a condition that the reference range including the identified difference is the fourth reference range. For example, the fourth allocation 1064 may allocate all (1077) of the time interval 1053 to the third sub event 1051-3 to the tenth sub event 1051-10 of the first CIS event 1051. However, it is not limited thereto.

For example, the processor 120 may identify a fifth allocation 1065 corresponding to a fifth reference range among the plurality of predetermined allocations 1060, on a condition that the reference range including the identified difference is the fifth reference range. For example, the fifth allocation 1065 may be to allocate all (1078) of the time interval 1053 to the first sub event 1052-1 to the eight sub event 1052-8 of the second CIS event 1052. However, it is not limited thereto.

As described above, the electronic device 101 may adaptively execute transmissions through the CIG event including the first CIS event and the second CIS event according to the state of the first link and the state of the second link, by identifying an allocation corresponding to a difference between the first data and the second data among the predetermined allocations.

Figure 11A:
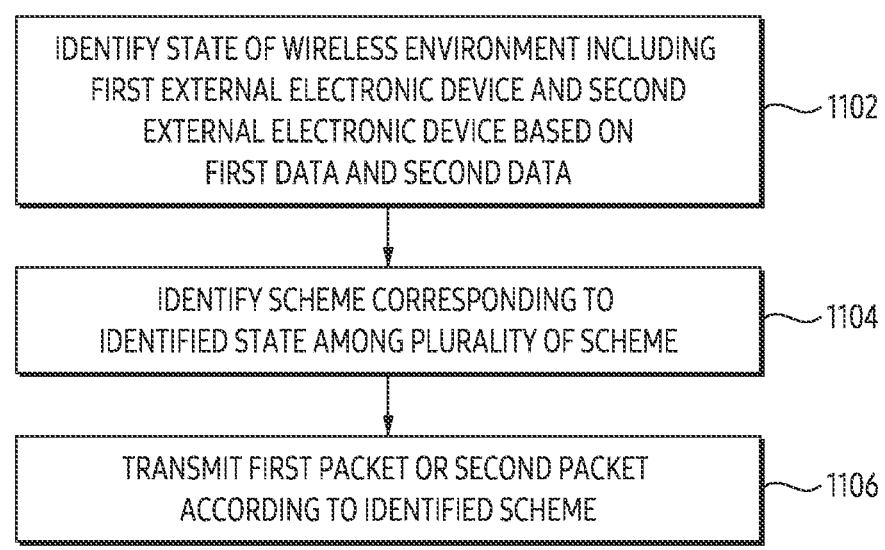
FIG. 11A illustrates an exemplary method of transmitting a packet through a CIG event having a hybrid arrangement according to a scheme corresponding to a state of a wireless environment among a plurality of schemes.

FIG. 11A illustrates an exemplary method of transmitting a packet through a CIG event having a hybrid arrangement according to a scheme corresponding to a state of a wireless environment among a plurality of schemes. The method may be executed by the electronic device 101 or the processor 120 of the electronic device 101 illustrated in FIG. 1. In an embodiment, operations 1102 to 1106 of FIG. 11A may be included in operation 306 of FIG. 3.

In FIG. 11A, in operation 1102, the processor 120 may identify the state of the wireless environment including the first external electronic device and the second external electronic device based on the first data and the second data. For example, the first data may indicate a change in the quality of the first link, and the second data may indicate a change in the quality of the second link. For example, the state of the wireless environment may be identified among candidate states defined in the electronic device 101. For example, the candidate states may be illustrated in FIG. 11B.

Figure 11B:
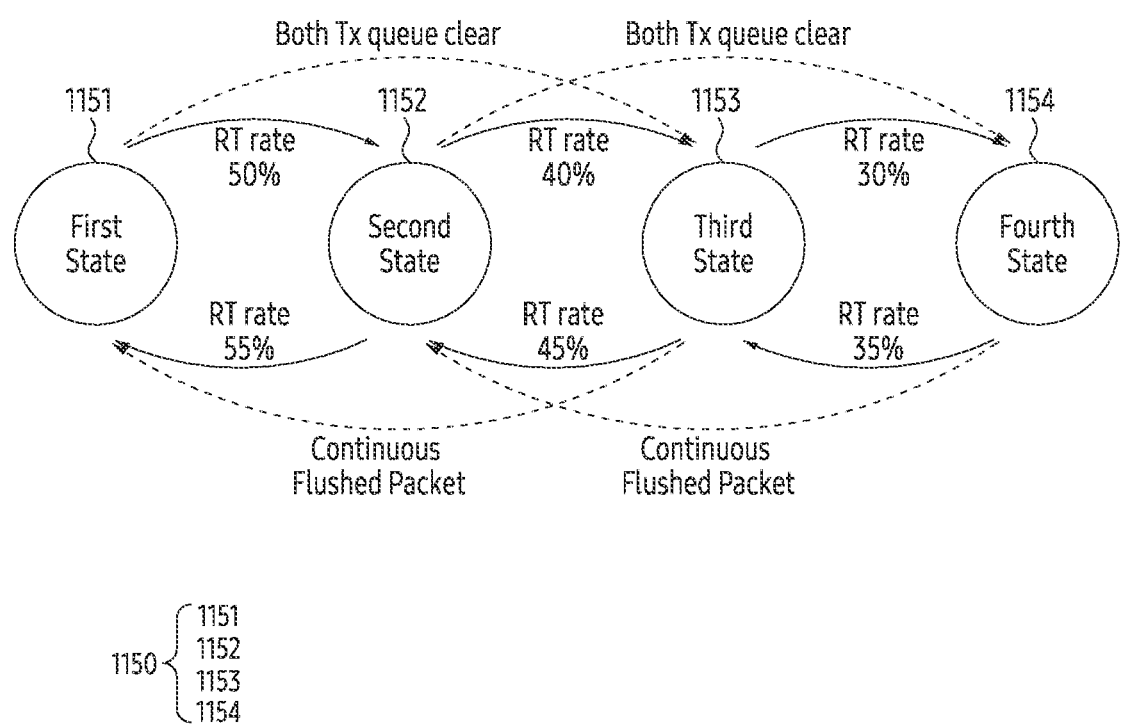
FIG. 11B illustrates an example of candidate states of a wireless environment.

FIG. 11B illustrates an example of candidate states of a wireless environment. In FIG. 11B, the candidate states 1150 may include a first state 1151, a second state 1152, a third state 1153, and a fourth state 1154.

For example, the processor 120 may identify that the state of the wireless environment, which was identified as the first state 1151, corresponds to the second state 1152, based on the first data and the second data. For example, the processor 120 may identify that the state of the wireless environment is changed from the first state 1151 to the second state 1152, based on the first data and the second data indicating that a retransmission rate is 50%.

For example, the processor 120 may identify that the state of the wireless environment, which was identified as the first state 1151, corresponds to the third state 1153, based on the first data and the second data. For example, the processor 120 may identify that the state of the wireless environment is changed from the first state 1151 to the third state 1153, based on the first data and the second data indicating that both the first buffer and the second buffer are empty.

For example, the processor 120 may identify that the state of the wireless environment, which was identified as the second state 1152, corresponds to the third state 1153, based on the first data and the second data. For example, the processor 120 may identify that the state of the wireless environment is changed from the second state 1152 to the third state 1153, based on the first data and the second data indicating that the retransmission rate is 40%.

For example, the processor 120 may identify that the state of the wireless environment, which was identified as the second state 1152, corresponds to the first state 1151, based on the first data and the second data. For example, the processor 120 may identify that the state of the wireless environment is changed from the second state 1152 to the first state 1151, based on the first data and the second data indicating that the retransmission rate is 55%.

For example, the processor 120 may identify that the state of the wireless environment, which was identified as the second state 1152, corresponds to the fourth state 1154, based on the first data and the second data. For example, the processor 120 may identify that the state of the wireless environment is changed from the second state 1152 to the fourth state 1154, based on the first data and the second data indicating that both the first buffer and the second buffer are empty.

For example, the processor 120 may identify that the state of the wireless environment, which was identified as the third state 1153, corresponds to the fourth state 1154, based on the first data and the second data. For example, the processor 120 may identify that the state of the wireless environment is changed from the third state 1153 to the fourth state 1154, based on the first data and the second data indicating that the retransmission rate is 30%.

For example, the processor 120 may identify that the state of the wireless environment, which was identified as the third state 1153, corresponds to the second state 1152, based on the first data and the second data. For example, the processor 120 may identify that the state of the wireless environment is changed from the third state 1153 to the second state 1152, based on the first data and the second data indicating that the retransmission rate is 45%.

For example, the processor 120 may identify that the state of the wireless environment, which was identified as the third state 1153, corresponds to the first state 1151, based on the first data and the second data. For example, the processor 120 may identify that the state of the wireless environment is changed from the third state 1153 to the first state 1151 based on the first data and the second data indicating that packets are continuously flushed.

For example, the processor 120 may identify that the state of the wireless environment, which was identified as the fourth state 1154, corresponds to the third state 1153, based on the first data and the second data. For example, the processor 120 may identify that the state of the wireless environment is changed from the fourth state 1154 to the third state 1153 based on the first data and the second data indicating that the retransmission rate is 35%.

For example, the processor 120 may identify that the state of the wireless environment, which was identified as the fourth state 1154, corresponds to the second state 1152, based on the first data and the second data. For example, the processor 120 may identify that the state of the wireless environment is changed from the fourth state 1154 to the second state 1152, based on the first data and the second data indicating that packets are continuously flushed.

Referring back to FIG. 11A, in operation 1104, the processor 120 may identify a scheme corresponding to the identified state among a plurality of scheme defined for the candidate states. For example, the plurality of schemes may include first schemes that allocate a next transmission to the first CIS event or the second CIS event each time a packet is transmitted within the time interval. For example, the first schemes may include a scheme illustrated in the description of FIG. 6, a scheme illustrated in the description of FIG. 7, and/or a scheme illustrated in the description of FIG. 9A. However, it is not limited thereto.

For example, the plurality of schemes may include second schemes that allocate at least a part of the time interval to the first CIS event and at least another part of the time interval to the second CIS event before transmitting a packet within the time interval. For example, the second schemes may include a scheme illustrated in the description of FIG. 10A. However, it is not limited thereto.

In operation 1106, the processor 120 may execute the allocation corresponding to the identified reference range. For example, the processor 120 may allocate at least a part of the time interval in which the first CIS event and the second CIS event overlap each other to at least one of the first CIS event and the second CIS event, based on the scheme illustrated in the description of FIG. 6, the scheme illustrated in the description of FIG. 7, the scheme illustrated in the description of FIG. 9A, and/or the scheme illustrated in the description of FIG. 10A.

As described above, the electronic device 101 may adaptively change a transmission method of the time interval in which the first CIS event and the second CIS event overlap based on a change in the wireless environment. The electronic device 101 may provide an enhanced service by such change.

Although FIGS. 11A and 11B illustrate an example of adaptively changing the allocation of the time interval according to the state of the wireless environment, the processor 120 may adaptively change the allocation of the time interval, instead of the state of the wireless environment, based on the type of service provided through the electronic device 101, the first external electronic device 201, and the second external electronic device 202.

For example, the processor 120 may change the allocation corresponding to the first type of service to the allocation corresponding to the second type of service, in response to identifying that services provided through the electronic device 101, the first external electronic device 201, and the second external electronic device 202 are changed from the first type of service to the second type of service.

In one embodiment, the electronic device and the method can provide a robust service by identifying time resources for communication between the first external electronic device and the second external electronic device based on quality of a first link between the electronic device and a first external electronic device and quality of a second link between the electronic device and a second external electronic device.

As described above, in one embodiment, an electronic device (e.g., the electronic device 101) may comprise a communication circuit (e.g., the wireless communication module 192 of FIG. 1), and a processor (e.g., the processor 120) operably coupled with the communication circuit.

In one embodiment, the processor may be configured to obtain a CIG event including a first CIS event and a second CIS event at least partially overlapped with at least a part of the first CIS event.

In one embodiment, the processor may be configured to identify first data indicating quality of a first link for the first CIS event and second data indicating quality of a second link for the second CIS event, the first link between the electronic device and a first external electronic device, the second link between the electronic device and a second external electronic device.

In one embodiment, the processor may be configured to transmit, by using the communication circuit, a first packet to the first external electronic device via a sub event of the first CIS event in a time interval where the first CIS event and the second CIS event are overlapped or transmit, by using the communication circuit, a second packet to the second external electronic device via a sub event of the second CIS event in the time interval where the first CIS event and the second CIS event are overlapped, based on the first data and the second data.

In one embodiment, the processor may be configured to refrain from transmitting the first packet via the sub event of the first CIS event and transmit the second packet via the sub event of the second CIS event by using the communication circuit, based on the quality of the first link higher the quality of the second link.

In one embodiment, the processor may be configured to transmit the first packet via the sub event of the first CIS event by using the communication circuit and refrain from transmitting the second packet via the sub event of the second CIS event, based on the quality of the first link lower than the quality of the second link.

In one embodiment, the processor may be configured to identify the first data and the second data, after transmitting a packet to one of the first external electronic device and the second external electronic device via one of another sub event of the first CIS event and another sub event of the second CIS event, the other sub event of the first CIS event previous to the sub event of the first CIS event, the other sub event of the second CIS event previous to the sub event of the second CIS event.

In one embodiment, the processor may be configured to transmit the first packet via the sub event of the first CIS event by using the communication circuit or transmit the second packet via the sub event of the second CIS event, based on the first data and the second data.

In one embodiment, the processor may be configured to identify the first data by identifying a state of a first buffer for the first CIS event.

In one embodiment, the processor may be configured to identify the second data by identifying a state of a second buffer for the second CIS event.

In one embodiment, the processor may be configured to identify the first data indicating a number of at least one PDU at least temporarily stored in the first buffer and the second data indicating a number of at least one PDU at least temporarily stored in the second buffer, after transmitting the packet via the other sub event of the first CIS event.

In one embodiment, the processor may be configured to transmit the first packet via the sub event of the first CIS event by using the communication circuit, based on the number of the at least one PDU, at least temporarily stored in the first buffer, greater than the number of the at least one PDU at least temporarily stored in the second buffer.

In one embodiment, the processor may be configured to transmit the second packet via the sub event of the second CIS event by using the communication circuit, based on the number of the at least one PDU, at least temporarily stored in the first buffer, smaller than the number of the at least one PDU at least temporarily stored in the second buffer.

In one embodiment, the processor may be configured to transmit the second packet via the sub event of the second CIS event by using the communication circuit, based on the number of the at least one PDU, at least temporarily stored in the first buffer, equal to the number of the at least one PDU at least temporarily stored in the second buffer.

In one embodiment, the processor may be configured to allocate all of the time intervals to sub events of the first CIS event in the time interval among the sub events of the first CIS event and sub events of the second CIS event in the time interval, and transmit at least one packet including the first packet via at least a part of the sub events of the first CIS event in all of the time intervals by using the communication circuit based on the quality of the first link higher than the quality of the second link.

In one embodiment, the processor may be configured to allocate all of the time intervals to the sub events of the second CIS event among the sub events of the first CIS event and the sub events of the second CIS event, and transmit at least one packet including the second packet via at least a part of the sub events of the second CIS event in all of the time intervals by using the communication circuit, based on the quality of the first link lower than the quality of the second link.

In one embodiment, the processor may be configured to allocate a first part of the time interval corresponding to the first reference range for the first CIS event, transmit at least one packet including the first packet via at least one sub event of the first CIS event in the first part of the time interval by using the communication circuit, and transmit at least one packet including the second packet via at least one sub event of the second CIS event in a second part of the time interval different from the first part of the time interval by using the communication circuit, based on difference of the first data and the second data that is within first reference range.

In one embodiment, the processor may be configured to allocate a third part of the time interval corresponding to the second reference range for the first CIS event, transmit at least one packet including the first packet via at least one sub event of the first CIS event in the third part of the time interval by using the communication circuit, and transmit at least one packet including the second packet via at least one sub event of the second CIS event in a fourth part of the time interval different from the third part of the time interval by using the communication circuit, the third part of the time interval having length different from length of the first part of the time interval, based on the difference in second reference range different from the first reference range.

In one embodiment, the first data may be data identified with respect to the first link based on a transmission via another CIG event, previous to the CIG event, including a third CIS event for the first link and a fourth CIS event for the second link at least partially overlapped with at least a part of the third CIS event.

In one embodiment, the second data may be data identified with respect to the second link based on a transmission via another CIG event, previous to the CIG event, including a third CIS event for the first link and a fourth CIS event for the second link at least partially overlapped with at least a part of the third CIS event.

In one embodiment, the processor may be configured to transmit the first packet to the first external electronic device via the sub event of the first CIS event by using the communication circuit or transmit the second packet to the second external electronic device via the sub event of the second CIS event by using the communication circuit, further based on type of a service provided through the CIG event.

In one embodiment, each of the first packet and the second packet may be a packet for transmitting audio data or re-transmitting the audio data.

In one embodiment, each of the first packet and the second packet may be a dummy packet or a null packet.

In one embodiment, the first packet may be a packet for requesting that the first external electronic device transmits a third packet to the electronic device.

In one embodiment, the second packet may be a packet for requesting that the second external electronic device transmits a fourth packet to the electronic device.

In one embodiment, the processor may be further configured to receive, as a response to the first packet, the third packet via the sub event of the first CIS event from the first external electronic device by using the communication circuit, or receive, as a response to the second packet, the fourth packet via the sub event of the second CIS event from the second external electronic device by using the communication circuit.

In one embodiment, identify the first data indicating remaining lifetime of the first packet scheduled to be transmitted via the sub event of the first CIS event and the second data indicating remaining lifetime of the second packet scheduled to be transmitted via the sub event of the second CIS event, after transmitting a packet to one of the first external electronic device and the second external electronic device via one of another sub event of the first CIS event and another sub event of the second CIS event, the other sub event of the first CIS event previous to the sub event of the first CIS event, the other sub event of the second CIS event previous to the sub event of the second CIS event.

In one embodiment, the processor may be configured to transmit the second packet via the sub event of the second CIS event by using the communication circuit and refrain from transmitting the first packet via the sub event of the first CIS event, based on the remaining lifetime of the first packet longer than the remaining lifetime of the second packet.

In one embodiment, the processor may be configured to transmit the first packet via the sub event of the first CIS event by using the communication circuit and refrain from transmitting the second packet via the sub event of the second CIS event, based on the remaining lifetime of the first packet shorter than the remaining lifetime of the second packet.

In one embodiment, the processor may be configured to identify a scheme from a first scheme allocating next transmission to the first CIS event or the second CIS event every transmitting of a packet in the time interval and a second scheme allocating at least a part of the time interval to the first CIS event and allocating at least another part of the time interval to the second CIS event before transmitting a packet in the time interval, based on the first data and the second data.

In one embodiment, the processor may be configured to transmit the first packet via the sub event of the first CIS event or transmit the second packet via the sub event of the second CIS event, according to the identified scheme.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. In one embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, in one embodiment, the module may be implemented in a form of an Application-Specific Integrated Circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In one embodiment, an operational procedure according to one or more embodiments of the disclosure may be included and provided in a computer program product. The computer program product may be traded as a product between a seller and a buyer. The computer program product may be distributed in the form of a machine-readable storage medium (e.g., Compact Disc Read Only Memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication circuit; and
a processor, operably coupled with the communication circuit, configured to:
obtain a Connected Isochronous Group (CIG) event including a first Connected Isochronous Stream (CIS) event and a second CIS event at least partially overlapped with at least a part of the first CIS event;
identify first data indicating a quality of a first link for the first CIS event and second data indicating a quality of a second link for the second CIS event, the first link being established between the electronic device and a first external electronic device, the second link being established between the electronic device and a second external electronic device; and
transmit, based on the first data and the second data by using the communication circuit, a first packet to the first external electronic device via a sub event of the first CIS event in time intervals where the first CIS event and the second CIS event are overlapped or transmit, based on the first data and the second data by using the communication circuit, a second packet to the second external electronic device via a sub event of the second CIS event in the time intervals where the first CIS event and the second CIS event are overlapped.

2. The electronic device of claim 1, wherein the processor is further configured to:
refrain, based on the quality of the first link higher the quality of the second link, from transmitting the first packet via the sub event of the first CIS event or transmitting the second packet via the sub event of the second CIS event; and
transmit, based on the quality of the first link lower than the quality of the second link, the first packet via the sub event of the first CIS event and refrain from transmitting the second packet via the sub event of the second CIS event.

3. The electronic device of claim 1, wherein the processor is further configured to:
identify the first data and the second data, after transmitting a packet to one of the first external electronic device and the second external electronic device via one of another sub event of the first CIS event and another sub event of the second CIS event,
the other sub event of the first CIS event being prior to the sub event of the first CIS event, the other sub event of the second CIS event being prior to the sub event of the second CIS event; and
transmit, based on the first data and the second data, the first packet via the sub event of the first CIS event or transmit, based on the first data and the second data, the second packet via the sub event of the second CIS event.

4. The electronic device of claim 3, wherein the processor is further configured to:
identify the first data by identifying a state of a first buffer for the first CIS event; and
identify the second data by identifying a state of a second buffer for the second CIS event.

5. The electronic device of claim 4, wherein the processor is further configured to:
identify the first data indicating a number of at least one Protocol Data Unit (PDU) at least temporarily stored in the first buffer and the second data indicating a number of at least one PDU at least temporarily stored in the second buffer, after transmitting the packet via the other sub event of the first CIS event;

transmit the first packet via the sub event of the first CIS event, based on the number of the at least one PDU, at least temporarily stored in the first buffer, which is greater than the number of the at least one PDU at least temporarily stored in the second buffer;

transmit the second packet via the sub event of the second CIS event, based on the number of the at least one PDU at least temporarily stored in the first buffer, which is smaller than the number of the at least one PDU at least temporarily stored in the second buffer; and transmit the second packet via the sub event of the second CIS event, based on the number of the at least one PDU at least temporarily stored in the first buffer, which is equal to the number of the at least one PDU at least temporarily stored in the second buffer.

6. The electronic device of claim 1, wherein the processor is further configured to:

based on the quality of the first link, which is higher than the quality of the second link, allocate all of the time intervals to sub events of the first CIS event in the time intervals among the sub events of the first CIS event and sub events of the second CIS event in the time intervals and transmit at least one packet including the first packet via at least a part of the sub events of the first CIS event in all of the time intervals; and based on the quality of the first link, which is lower than the quality of the second link, allocate all of the time intervals to the sub events of the second CIS event among the sub events of the first CIS event and the sub events of the second CIS event and transmit at least one packet including the second packet via at least a part of the sub events of the second CIS event in all of the time intervals.

7. The electronic device of claim 1, wherein the processor is further configured to:

based on a difference of the first data and the second data that is within a first reference range, allocate a first part of the time intervals corresponding to the first reference range for the first CIS event, transmit at least one packet including the first packet via at least one sub event of the first CIS event in the first part of the time intervals, and transmit at least one packet including the second packet via at least one sub event of the second CIS event in a second part of the time intervals different from the first part of the time intervals; and based on a difference in second reference range different from the first reference range, allocate a third part of the time intervals corresponding to the second reference range for the first CIS event, transmit at least one packet including the first packet via at least one sub event of the first CIS event in the third part of the time intervals, and transmit at least one packet including the second packet via at least one sub event of the second CIS event in a fourth part of the time intervals different from the third part of the time intervals, the third part of the time intervals having length different from length of the first part of the time intervals.

8. The electronic device of claim 7, wherein the first data is identified with respect to the first link based on a transmission via another CIG event, prior to the CIG event, including a third CIS event for the first link and a fourth CIS event for the second link at least partially overlapped with at least a part of the third CIS event, and wherein the second data is identified with respect to the second link based on a transmission via another CIG event, prior to the CIG event, including a third CIS event for the first link and a fourth CIS event for the second link at least partially overlapped with at least a part of the third CIS event.

9. The electronic device of claim 1, wherein the processor is further configured to transmit the first packet to the first external electronic device via the sub event of the first CIS event or transmit the second packet to the second external electronic device via the sub event of the second CIS event, further based on a type of a service provided through the CIG event.

10. The electronic device of claim 1, wherein each of the first packet and the second packet transmits audio data.

11. The electronic device of claim 1, wherein each of the first packet and the second packet is a dummy packet or a null packet, wherein the first packet requests that the first external electronic device transmits a third packet to the electronic device, wherein the second packet requests that the second external electronic device transmits a fourth packet to the electronic device, and wherein the processor is further configured to:

receive, as a response to the first packet, the third packet via the sub event of the first CIS event from the first external electronic device; or receive, as a response to the second packet, the fourth packet via the sub event of the second CIS event from the second external electronic device.

12. The electronic device of claim 1, wherein the processor is further configured to:

identify the first data indicating a remaining lifetime of the first packet scheduled to be transmitted via the sub event of the first CIS event and the second data indicating a remaining lifetime of the second packet scheduled to be transmitted via the sub event of the second CIS event, after transmitting a packet to one of the first external electronic device and the second external electronic device via one of another sub event of the first CIS event and another sub event of the second CIS event, the other sub event of the first CIS event being prior to the sub event of the first CIS event, the other sub event of the second CIS event being prior to the sub event of the second CIS event;

transmit the second packet via the sub event of the second CIS event and refrain from transmitting the first packet via the sub event of the first CIS event, based on the remaining lifetime of the first packet, which is longer than the remaining lifetime of the second packet; and transmit the first packet via the sub event of the first CIS event and refrain from transmitting the second packet via the sub event of the second CIS event, based on the remaining lifetime of the first packet, which is shorter than the remaining lifetime of the second packet.

13. The electronic device of claim 1, wherein the processor is further configured to:

identify a scheme from a first scheme allocating a next transmission to the first CIS event or the second CIS event transmitting of a packet in the time intervals and a second scheme allocating at least a part of the time intervals to the first CIS event and allocating at least another part of the time intervals to the second CIS event before transmitting a packet in the time intervals, based on the first data and the second data; and transmit the first packet via the sub event of the first CIS event or transmit the second packet via the sub event of the second CIS event, based on the identified scheme.

14. A method for an electronic device, the method comprising:
obtaining a Connected Isochronous Group (CIG) event including a first Connected Isochronous Stream (CIS) event and a second CIS event at least partially overlapped with at least a part of the first CIS event;
identifying first data indicating a quality of a first link for the first CIS event and second data indicating a quality of a second link for the second CIS event, the first link being established between the electronic device and a first external electronic device, the second link being established between the electronic device and a second external electronic device; and
transmitting, based on the first data and the second data, a first packet to the first external electronic device via a sub event of the first CIS event in time intervals where the first CIS event and the second CIS event are overlapped or transmitting, based on the first data and the second data, a second packet to the second external electronic device via a sub event of the second CIS event in the time intervals where the first CIS event and the second CIS event are overlapped.

15. The method of claim 14, wherein transmitting, based on the first data and the second data, the first packet or transmitting, based on the first data and the second data, the second packet comprises:
refraining, based on the quality of the first link higher the quality of the second link, from transmitting the first packet via the sub event of the first CIS event and transmitting, based on the quality of the first link higher the quality of the second link, the second packet via the sub event of the second CIS event; and
transmitting, based on the quality of the first link lower than the quality of the second link, the first packet via the sub event of the first CIS event and refraining, based on the quality of the first link lower than the quality of the second link, from transmitting the second packet via the sub event of the second CIS event.

16. The method of claim 14, wherein transmitting, based on the first data and the second data, the first packet or transmitting, based on the first data and the second data, the second packet comprises:
identifying the first data and the second data, after transmitting a packet to one of the first external electronic device and the second external electronic device via one of another sub event of the first CIS event and another sub event of the second CIS event, the other sub event of the first CIS event being prior to the sub event of the first CIS event, the other sub event of the second CIS event being prior to the sub event of the second CIS event; and
transmitting, based on the first data and the second data, the first packet via the sub event of the first CIS event or transmitting, based on the first data and the second data, the second packet via the sub event of the second CIS event.

17. The method of claim 16, wherein identifying the first data and the second data comprises:
identifying the first data by identifying a state of a first buffer for the first CIS event; and
identifying the second data by identifying a state of a second buffer for the second CIS event.

18. The method of claim 17, wherein identifying the first data and the second data comprises identifying the first data indicating a number of at least one Protocol Data Unit (PDU) at least temporarily stored in the first buffer and the second data indicating a number of at least one PDU at least temporarily stored in the second buffer, after transmitting the packet via the other sub event of the first CIS event, and
wherein transmitting the first packet or the second packet based on the first data and the second data comprises:
transmitting the first packet via the sub event of the first CIS event, based on the number of the at least one PDU, at least temporarily stored in the first buffer, which is greater than the number of the at least one PDU at least temporarily stored in the second buffer;
transmitting the second packet via the sub event of the second CIS event, based on the number of the at least one PDU, at least temporarily stored in the first buffer, which is smaller than the number of the at least one PDU at least temporarily stored in the second buffer; and
transmitting the second packet via the sub event of the second CIS event, based on the number of the at least one PDU, at least temporarily stored in the first buffer, which is equal to the number of the at least one PDU at least temporarily stored in the second buffer.

19. The method of claim 14, wherein transmitting, based on the first data and the second data, the first packet or transmitting, based on the first data and the second data, the second packet comprises:
based on the quality of the first link, which is higher than the quality of the second link, allocating all of the time intervals to sub events of the first CIS event in the time intervals among the sub events of the first CIS event and sub events of the second CIS event in the time intervals and transmitting at least one packet including the first packet via at least a part of the sub events of the first CIS event in all of the time intervals; and
based on the quality of the first link, which is lower than the quality of the second link, allocating all of the time intervals to the sub events of the second CIS event among the sub events of the first CIS event and the sub events of the second CIS event and transmitting at least one packet including the second packet via at least a part of the sub events of the second CIS event in all of the time intervals.

20. The method of claim 14, wherein transmitting, based on the first data and the second data, the first packet or transmitting, based on the first data and the second data, the second packet comprises:
based on difference of the first data and the second data that is within a first reference range, allocating a first part of the time intervals corresponding to the first reference range for the first CIS event, transmitting at least one packet including the first packet via at least one sub event of the first CIS event in the first part of the time intervals, and transmitting at least one packet including the second packet via at least one sub event of the second CIS event in a second part of the time intervals different from the first part of the time intervals; and
based on a difference in a second reference range different from the first reference range, allocating a third part of the time intervals corresponding to the second reference range for the first CIS event, transmitting at least one packet including the first packet via at least one sub event of the first CIS event in the third part of the time intervals, and transmitting at least one packet including the second packet via at least one sub event of the second CIS event in a fourth part of the time intervals different from the third part of the time intervals, the third part of the time intervals having length different from length of the first part of the time intervals.

\* \* \* \* \*